(12) United States Patent
Doherty et al.

(10) Patent No.: US 12,271,683 B2
(45) Date of Patent: *Apr. 8, 2025

(54) METHODS FOR SERVING INTERACTIVE CONTENT TO A USER

(71) Applicant: Yieldmo, Inc., Nashua, NH (US)

(72) Inventors: Connor Francis Doherty, Nashua, NH (US); David Michael Goligorsky, Nashua, NH (US); Shawn Sprockett, Nashua, NH (US); Eric (Ge) Wu, Nashua, NH (US); Yiming Bao, Nashua, NH (US); Firecrow Silvernight, Nashua, NH (US); David Sebag, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,852

(22) Filed: Sep. 27, 2023

(65) Prior Publication Data

US 2024/0020460 A1    Jan. 18, 2024

Related U.S. Application Data

(63) Continuation of application No. 18/107,884, filed on Feb. 9, 2023, now Pat. No. 11,809,811, which is a
(Continued)

(51) Int. Cl.
*G06F 3/0481*    (2022.01)
*G06F 3/04812*    (2022.01)
(Continued)

(52) U.S. Cl.
CPC ........ *G06F 40/143* (2020.01); *G06F 3/04812* (2013.01); *G06F 3/0485* (2013.01);
(Continued)

(58) Field of Classification Search
CPC ............ G06F 3/04812; G06F 3/04855; G06F 17/2247; G06F 17/212; G06F 40/143;
(Continued)

(56) References Cited

U.S. PATENT DOCUMENTS 6,760,536 B1 *  7/2004  Amir .................... G11B 27/005
                                                386/346
6,782,188 B1 *  8/2004  Ido ....................... G11B 27/036
                                                386/323
(Continued)

FOREIGN PATENT DOCUMENTS

AU    2013332591 A1 *  4/2015  ............. G06F 16/00
AU    2014278676 A1 * 12/2015  ............. G06Q 30/02
(Continued)

*Primary Examiner* — Steven P Sax
(74) *Attorney, Agent, or Firm* — Run8 Patent Group, LLC; Peter Miller; Leah Raddatz

(57) ABSTRACT

One variation of a method for serving interactive content to a user includes, at a visual element inserted into a document accessed by a computing device: loading a first frame from a digital video; in response to a scroll-down event that moves the visual element upward from a bottom of a window rendered on the computing device toward a top of the window, seeking from the first frame through a subset of frames in the digital video in a first direction at a rate corresponding to a scroll rate of the scroll-down event, the subset of frames spanning a duration of the digital video corresponding to a length of the scroll-down event; and, in response to termination of the scroll-down event with the visual element remaining in view within the window, playing the digital video forward from a last frame in the subset of frames in the digital video.

25 Claims, 8 Drawing Sheets

Related U.S. Application Data continuation of application No. 17/039,961, filed on Sep. 30, 2020, now Pat. No. 11,604,918, which is a continuation of application No. 15/937,062, filed on Mar. 27, 2018, now Pat. No. 10,832,729, which is a continuation of application No. 15/816,833, filed on Nov. 17, 2017, now Pat. No. 9,966,109, which is a continuation of application No. 15/217,879, filed on Jul. 22, 2016, now Pat. No. 9,852,759, which is a continuation-in-part of application No. PCT/US2015/064460, filed on Dec. 8, 2015.

(60) Provisional application No. 62/197,929, filed on Jul. 28, 2015, provisional application No. 62/068,646, filed on Oct. 25, 2014.

(51) Int. Cl.

| | | |
|---|---|---|
| *G06F 3/0485* | (2022.01) | |
| *G06F 3/0488* | (2022.01) | |
| *G06F 40/106* | (2020.01) | |
| *G06F 40/143* | (2020.01) | |
| *G06Q 30/02* | (2023.01) | |
| *G11B 27/00* | (2006.01) | |
| *G11B 27/031* | (2006.01) | |
| *G11B 27/036* | (2006.01) | |
| *G11B 27/10* | (2006.01) | |
| *G11B 27/11* | (2006.01) | |
| *G11B 27/30* | (2006.01) | |
| *H04N 21/431* | (2011.01) | |
| *H04N 21/433* | (2011.01) | |
| *H04N 21/442* | (2011.01) | |
| *H04N 21/472* | (2011.01) | |
| *H04N 21/482* | (2011.01) | |
| *H04N 21/81* | (2011.01) | |
| *H04L 67/02* | (2022.01) | |

(52) U.S. Cl.
CPC .......... *G06F 3/0488* (2013.01); *G06F 40/106* (2020.01); *G06Q 30/02* (2013.01); *G11B 27/005* (2013.01); *G11B 27/031* (2013.01); *G11B 27/036* (2013.01); *G11B 27/102* (2013.01); *G11B 27/11* (2013.01); *G11B 27/3081* (2013.01); *H04N 21/431* (2013.01); *H04N 21/4333* (2013.01); *H04N 21/44204* (2013.01); *H04N 21/47217* (2013.01); *H04N 21/482* (2013.01); *H04N 21/812* (2013.01); *H04L 67/02* (2013.01)

(58) Field of Classification Search
CPC .... G06F 40/106; G06F 3/0482; G06F 3/0484; G06F 2/0487; H04N 21/47; H04N 21/482; H04N 21/485; H04N 21/431; H04N 21/472; H04N 21/812; H04N 21/47217; H04N 21/4333; H04N 21/44204; H04N 21/25841; G11B 27/005; G11B 27/031; G11B 27/036; G11B 27/102; G06Q 30/02; G06B 27/11; G06B 27/3081; H04L 67/02
See application file for complete search history.

(56) References Cited

U.S. PATENT DOCUMENTS

| | | | | |
|---|---|---|---|---|
| 6,807,367 | B1 * | 10/2004 | Durlach | G09B 5/06 |
| | | | | 386/221 |
| 7,348,967 | B2 * | 3/2008 | Zadesky | G06F 1/1626 |
| | | | | 345/157 |
| 7,804,506 | B2 * | 9/2010 | Bates | G06T 7/246 |
| | | | | 345/589 |
| 8,701,145 | B1 * | 4/2014 | Berger | H04N 21/2668 |
| | | | | 725/35 |
| 8,875,023 | B2 * | 10/2014 | Cronin | G06F 3/0484 |
| | | | | 715/722 |
| 9,247,313 | B1 * | 1/2016 | Lewis | H04N 21/44004 |
| 9,286,622 | B2 * | 3/2016 | Choi | G06Q 30/0269 |
| 9,448,723 | B2 * | 9/2016 | Wong | G06F 3/04886 |
| 9,707,481 | B2 * | 7/2017 | Perlman | H04N 21/4781 |
| 9,733,809 | B1 * | 8/2017 | Greene | G06F 3/0486 |
| 9,852,759 | B2 * | 12/2017 | Doherty | H04N 21/47217 |
| 10,032,303 | B2 * | 7/2018 | Naveh | G06T 19/20 |
| 10,467,652 | B2 * | 11/2019 | McConnell | G06Q 30/0245 |
| 11,809,811 | B2 * | 11/2023 | Doherty | G11B 27/036 |
| 2002/0122060 | A1 * | 9/2002 | Markel | G06F 40/143 |
| | | | | 715/760 |
| 2006/0059426 | A1 * | 3/2006 | Ogikubo | G11B 27/34 |
| | | | | 386/230 |
| 2007/0066403 | A1 * | 3/2007 | Conkwright | A63F 13/803 |
| | | | | 463/43 |
| 2007/0189708 | A1 * | 8/2007 | Lerman | G11B 27/34 |
| | | | | 386/280 |
| 2007/0239566 | A1 * | 10/2007 | Dunnahoo | G06Q 40/00 |
| | | | | 705/26.1 |
| 2008/0115062 | A1 * | 5/2008 | Ngan | G11B 27/34 |
| | | | | 715/723 |
| 2008/0152297 | A1 * | 6/2008 | Ubillos | G06F 3/0486 |
| | | | | 386/282 |
| 2008/0300872 | A1 * | 12/2008 | Basu | G06F 16/7844 |
| | | | | 704/235 |
| 2009/0079823 | A1 * | 3/2009 | Bellamy | G08B 13/1968 |
| | | | | 348/143 |
| 2009/0149749 | A1 * | 6/2009 | Heron | G01S 7/52088 |
| | | | | 600/509 |
| 2009/0265243 | A1 * | 10/2009 | Karassner | G06Q 30/0275 |
| | | | | 705/14.54 |
| 2010/0031149 | A1 * | 2/2010 | Gentile | H04N 5/91 |
| | | | | 348/135 |
| 2010/0153544 | A1 * | 6/2010 | Krassner | G06F 40/143 |
| | | | | 709/224 |
| 2010/0274674 | A1 * | 10/2010 | Roberts | H04N 21/8456 |
| | | | | 715/720 |
| 2011/0125571 | A1 * | 5/2011 | Jagadish | G06Q 30/0256 |
| | | | | 705/14.54 |
| 2013/0088520 | A1 * | 4/2013 | Mak | G06F 3/0488 |
| | | | | 345/684 |
| 2013/0148861 | A1 * | 6/2013 | Ferlatte | G06V 20/42 |
| | | | | 382/107 |
| 2013/0151970 | A1 * | 6/2013 | Achour | G06Q 10/101 |
| | | | | 715/723 |
| 2013/0195421 | A1 * | 8/2013 | Chen | G11B 27/034 |
| | | | | 348/E7.003 |
| 2013/0211887 | A1 * | 8/2013 | Kim | G06Q 30/0241 |
| | | | | 705/14.4 |
| 2014/0095328 | A1 * | 4/2014 | Forouzandeh | G06Q 30/0277 |
| | | | | 705/14.73 |
| 2014/0150026 | A1 * | 5/2014 | Mountain | H04N 21/42204 |
| | | | | 725/52 |
| 2014/0164921 | A1 * | 6/2014 | Salinas | G06F 16/29 |
| | | | | 715/716 |
| 2014/0188606 | A1 * | 7/2014 | Moore | G06Q 30/0251 |
| | | | | 705/14.49 |
| 2014/0289241 | A1 * | 9/2014 | Anderson | G06F 16/48 |
| | | | | 707/736 |
| 2014/0380394 | A1 * | 12/2014 | Perron | H04N 21/2665 |
| | | | | 725/116 |
| 2015/0007101 | A1 * | 1/2015 | Lewis | G06F 3/0485 |
| | | | | 715/784 |
| 2015/0081695 | A1 * | 3/2015 | Schillings | G06F 16/9535 |
| | | | | 707/736 |
| 2015/0082339 | A1 * | 3/2015 | Sumitomo | H04N 21/812 |
| | | | | 725/32 |
| 2015/0106712 | A1 * | 4/2015 | Oh | G06F 3/0482 |
| | | | | 715/716 |

(56) References Cited

U.S. PATENT DOCUMENTS

| | | | |
|---|---|---|---|
| 2015/0221335 A1* | 8/2015 | Licata | H04N 5/783 |
| | | | 386/279 |
| 2015/0373392 A1* | 12/2015 | Sriraman | H04N 21/4821 |
| | | | 725/52 |
| 2016/0018983 A1* | 1/2016 | Bostick | G06F 3/0488 |
| | | | 715/720 |
| 2018/0032997 A1* | 2/2018 | Gordon | G06Q 30/0269 |

FOREIGN PATENT DOCUMENTS

| | | | | |
|---|---|---|---|---|
| BR | 102014006152 A2 * | 2/2016 | | G06F 3/011 |
| CA | 2298049 C * | 4/2010 | | G06F 3/04855 |
| CA | 2819136 A1 * | 6/2012 | | G06F 16/743 |
| CN | 100368969 C * | 2/2008 | | G06F 1/1626 |
| CN | 100409358 C * | 8/2008 | | G11B 27/105 |
| CN | 102084386 A * | 6/2011 | | G06F 16/00 |
| CN | 103187015 A * | 7/2013 | | |
| CN | 104574125 A * | 4/2015 | | |
| CN | 105493017 A * | 4/2016 | | G06F 3/04817 |
| CN | 103713801 B * | 4/2018 | | G06F 3/0412 |
| EP | 1538536 A1 * | 6/2005 | | G06F 16/44 |
| JP | 2004519968 A * | 7/2004 | | |
| JP | 4787408 B2 * | 10/2011 | | H04N 21/2365 |
| JP | 6619734 B2 * | 12/2019 | | G06Q 30/0246 |
| WO | WO-2010071666 A1 * | 6/2010 | | H04L 67/22 |

\* cited by examiner

METHODS FOR SERVING INTERACTIVE CONTENT TO A USER

CROSS-REFERENCE TO RELATED APPLICATIONS

This Application is a continuation application of U.S. patent application Ser. No. 18/107,884, filed on 9 Feb. 2023, which is a continuation application of U.S. patent application Ser. No. 17/039,961, filed on 30 Sep. 2020, which is a continuation application of U.S. patent application Ser. No. 15/937,062, filed on 27 Mar. 2018, which is a continuation application of U.S. patent application Ser. No. 15/816,833, filed on 17 Nov. 2017, which is a continuation application of U.S. patent application Ser. No. 15/217,879, filed on 22 Jul. 2016, which claims priority to U.S. Provisional Application No. 62/197,929, filed on 28 Jul. 2015 and is a continuation-in-part application of PCT Application No. PCT/US 15/64460, filed on 8 Dec. 2015, which claims priority to U.S. Provisional Application No. 62/068,646, filed on 25 Oct. 2014, all of which are incorporated in their entireties by this reference.

The Application is related to U.S. patent application Ser. No. 14/592,883, filed on 8 Jan. 2015, which claims priority to U.S. Provisional Application No. 62/068,646, filed on 25 Oct. 2014, both which are incorporated in their entireties by this reference.

TECHNICAL FIELD

This invention relates generally to the field of mobile advertising and more specifically to new and useful methods for serving interactive content to a user in the field of mobile advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

Figure 1:
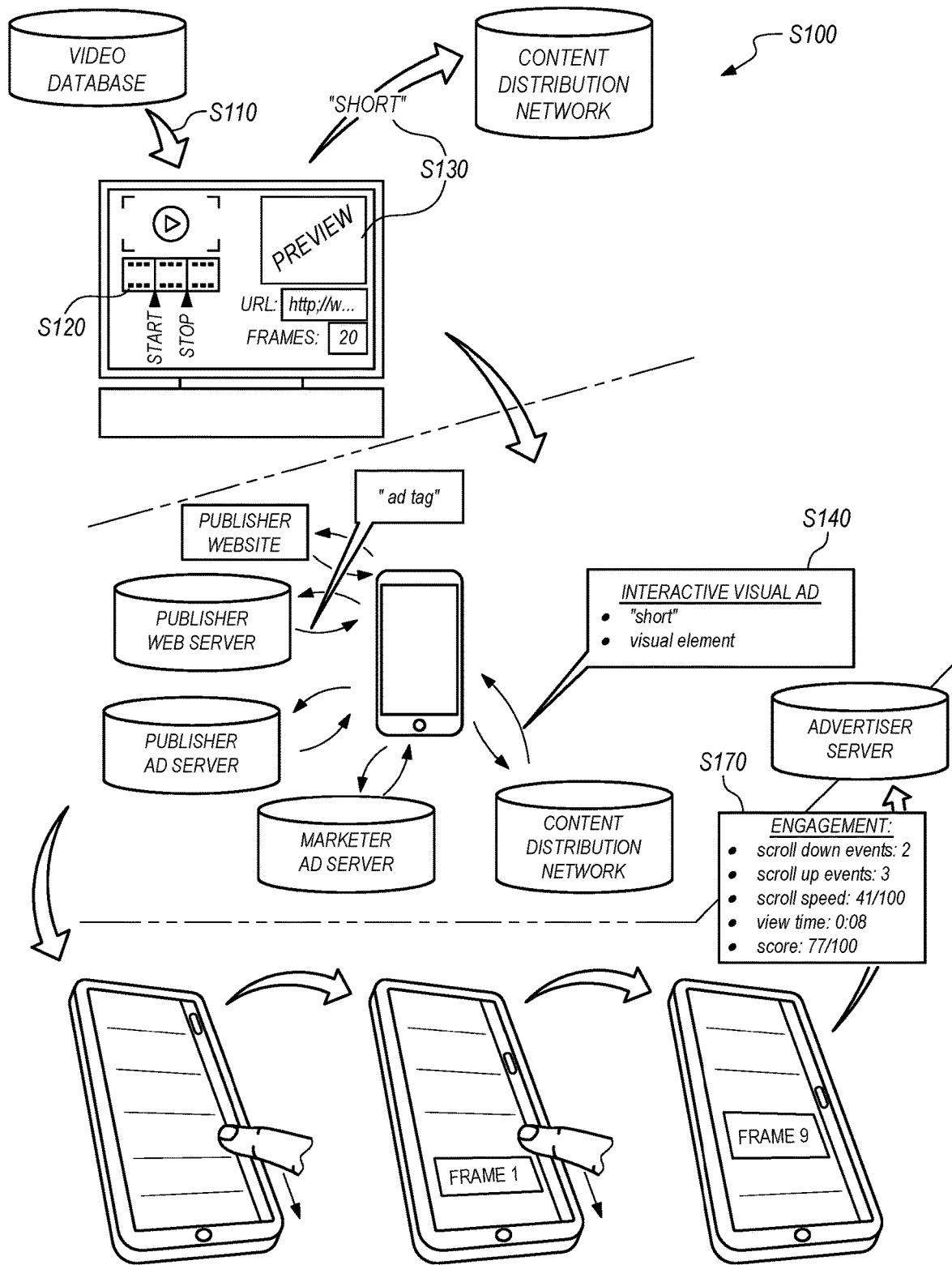
FIG. 1 is a flowchart representation of a first method.

As shown in FIG. 1, a method for serving interactive content to a user includes: accessing a digital video from a database in Block S110; selecting a subset of frames from the digital video in Block S120, the subset of frames including a predefined number of frames from the digital video; and compiling the subset of frames into a single static image file in Block S130. The first method also includes, at a computing device: at a first time, in response to a first scroll-down event that moves a visual element into view at a bottom of a window rendered on a display of the computing device, inserting a first region of the image file corresponding to a first frame in the subset of frames into the visual element in Block S150; at a second time succeeding the first time, inserting a second region of the image file into the visual element in response to a second scroll-down event that moves the visual element to a second position above the bottom of the window in Block S152, the second region of the image file corresponding to a second frame succeeding the first frame in the subset of frames; at a third time succeeding the second time, inserting a last region of the image file into the visual element in response to a third scroll-down event that moves the visual element to a top of the window in Block S154, the last region of the image file corresponding to a last frame succeeding the second frame in the subset of frames; and at a fourth time succeeding the third time, inserting the second region of the image file into the visual element in response to a scroll-up event that moves the visual element to the second position of the window in Block S160, the second region of the image file corresponding to a second frame succeeding the first frame in the subset of frames.

Figure 3:
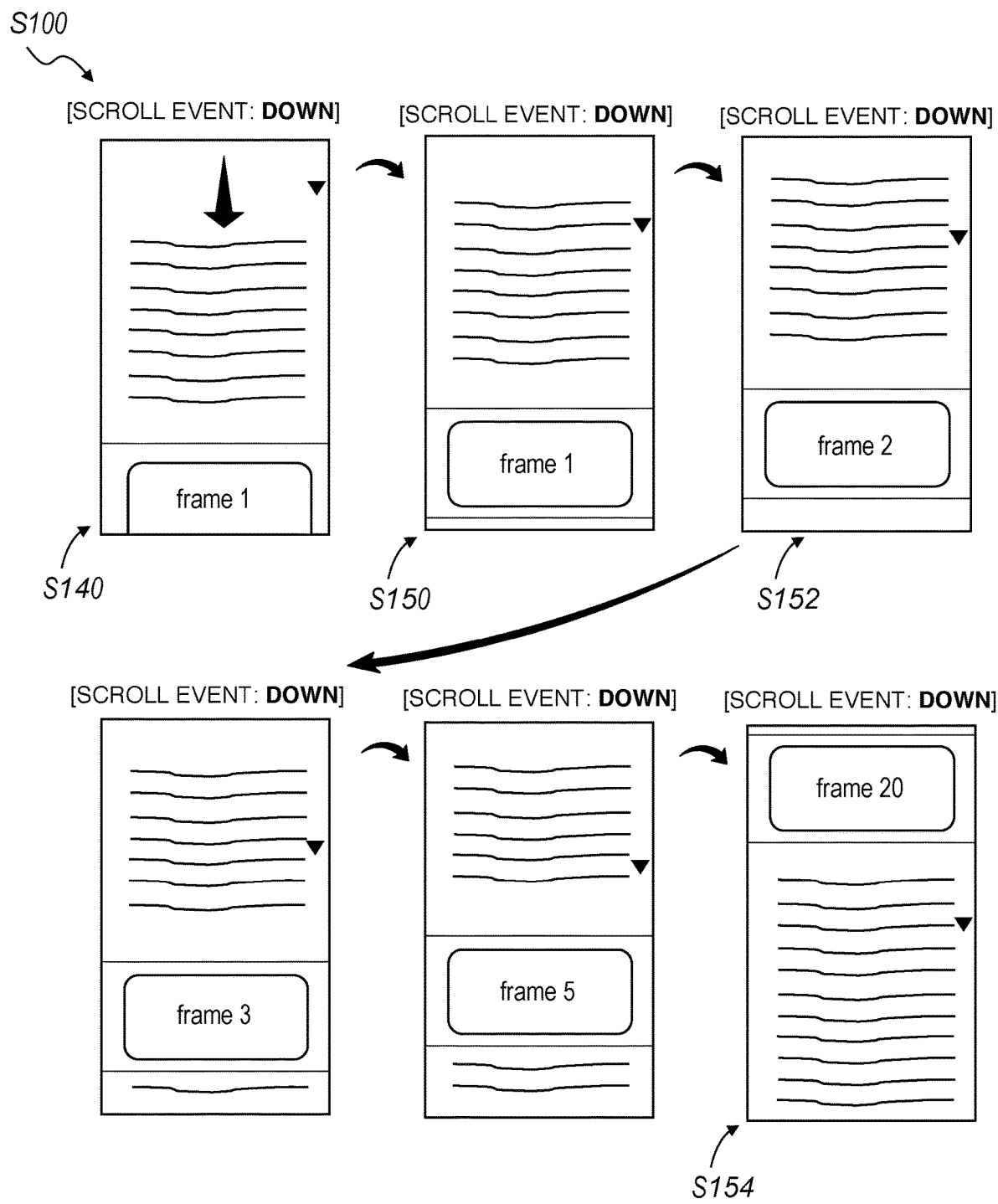
FIG. 3 is a flowchart representation of one variation of the first method.
Figure 4:
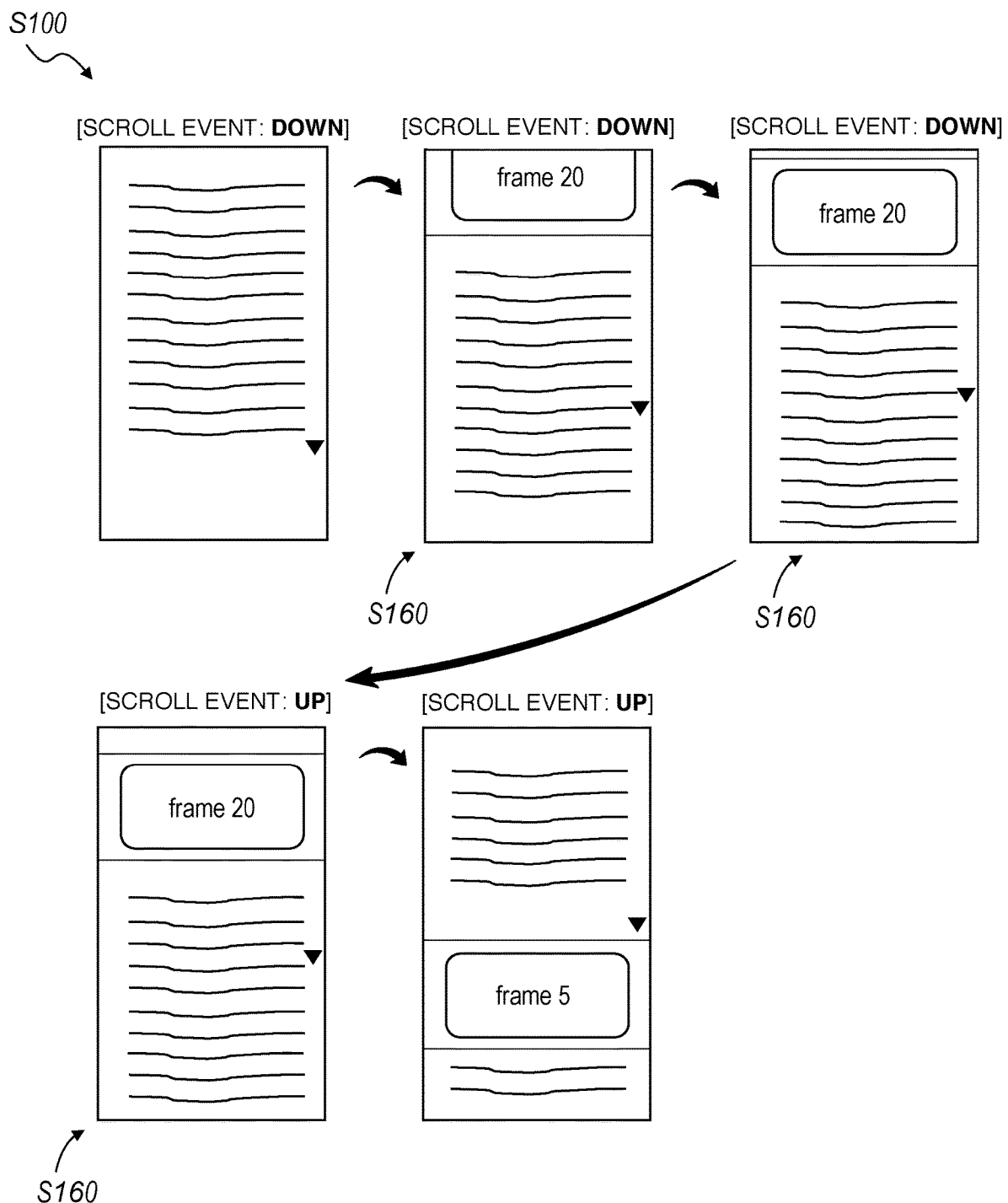
FIG. 4 is a flowchart representation of one variation of the first method.

As shown in FIGS. 3 and 4, one variation of the first method S100 includes: accessing a digital video from a database in Block S110; selecting a subset of frames from the digital video, the subset of frames including a predefined number of frames from the digital video in Block S120; and storing the subset of frames in a container in Block S130. This variation of the first method S100 also includes, at a visual element inserted into a document accessed by a computing device: loading the container from a remote database in Block S140; during a scroll-down event at the computing device, rendering a first frame, from the container, between when a top edge of the visual element first enters a window rendered on a display of the computing device and when the visual element is shown in full at the bottom of the window in a first position in Block S150; during the scroll-down event, rendering a second frame, from the container, in replacement of the first frame in response to relocation of the visual element from the first position to a second position within the window above the first position in Block S152; during the scroll-down event, rendering a last frame, from the container, in response to relocation of the visual element to a top position within the window above the second position in Block S154; and in response to a scroll-up event at the computing device, rendering the second frame in response to relocation of the visual element from the top position to the second position within the window in Block S160.

1.2 Applications

Generally, the first method S100 can be executed by an advertising (or "ad") platform to extract a subset of "frames" from visual content (e.g., a digital advertising video) to serve this subset of frames to an instance of a visual element inserted into a document accessed on a computing device.

As a display of the computing device renders the visual element within a window (i.e., a viewable area of the display), the visual element seeks through the subset of frames based on the position of the visual element within the window. The ad platform can compile an existing digital advertising video or multiple static advertising images (or "stills") into one static image file (e.g., a .jpg file) or into one media file (or "container," such as a .gif or .mp4 file) in Blocks S110, S120, and S130; and an instance of the visual element inserted into a webpage or other document accessed by a computing device can load the static image file or the media file in Block S140 and then render a first image from the static image file or media file when the visual element is moved into view at a first position at the bottom of a window displayed on the computing device, render a second image from the static image file or media file when the visual element is moved into a second position above the first position within the window, render a third image from the static image file or media file when the visual element is moved into a third position above the second position within the window, and render a last image from the static image file or media file when the visual element is moved into a last position at the top of the window and above the third position within the window, etc. In particular, as a user navigates through the webpage or other document calling the visual element, the visual element can seek or step forward through the subset of frames during scroll-down events in Blocks S150, S152, S154 and can seek backward through the subset of frames during scroll-up events in Block S160. The visual element can thus link content shown within the visual element at any given time to the (vertical) position of the visual element rendered on the computing device, thereby enabling the user both to view the subset of frames as a short (e.g., one-second) video clip by quickly scrolling the visual element between the bottom and top of the window and to visually consume each frame separately by moving the visual element to discrete positions within the window rendered on the computing device.

In one example, the ad platform (and/or an ad tech vendor, a publisher, or an ad agency,) accesses a 30-second video ad containing twenty-four frames per second, extracts a total of twenty frames from the video ad between a set "beginning" timestamp and a set "end" timestamp within the video ad, and assembles these twenty frames—in chronological order—into a single static image file, such as a single JPEG file. In this example, the ad platform can select twenty consecutive frames from the video ad in order to generate a single static image file spanning approximately one second and can later serve this image file to an instance of the visual element called by a webpage accessed by a web browser or by a mobile application executing on a user's computing device (e.g., smartphone, tablet, smartwatch). When the single image file is served to the instance of the visual element and the user quickly scrolls down through the webpage or mobile application (e.g., at a rate approximately equivalent to the height of the window less the height of the visual element per second), the visual element can cycle through all frames contained in the single image file at a rate approximating the frame rate and video speed of the original 30-second video such that the visual element appears to the user to display a one-second clip at a proper frame rate of twenty-four frames per second. Alternatively, in this example, the ad platform can select twenty frames at 1.5-second intervals along the video ad in order to generate a single static image file spanning the entire video ad. When this single image file is served to an instance of the visual element and a user quickly scrolls down through the webpage to move the visual element from the bottom of the window to the top of the window, the visual element can cycle through all frames contained in the single image file, thereby presenting the entirety of the original video ad to the user but at a speed thirty-times greater than the original video ad.

In the foregoing examples, the visual element can also cycle through the images in reverse as the user scrolls up and can preserve a particular image—from the image file—within the visual element when the user scrolls the visual element slowly through the window or pauses the visual element with a particular range of vertical positions within the window corresponding to the particular image. The visual element can thus cycle through images in the image file according to schema imitating play, pause, seek forward, and seek backward functions tied to changes to the position of the visual element rendered within the window during scroll events at the computing device.

Generally, by generating an image file or media file of any other type (hereinafter a "short") containing multiple distinct or unique frames from a video ad and serving frames from the video ad to a user through a visual element rendered on a display of a computing device, the ad platform and visual element can cooperate to generate and serve video-like advertising content to the user, which may be more visually engaging than static visual advertising content. Similarly, by tying presentation of this subset of frames from the video ad to the position of the visual element within the window to emulate play, pause, seek forward, and seek backward functions as the user manually scrolls the visual element up and down within the window, the system can further increase the user's engagement with this visual content. For example, the ad platform and visual element can cooperate to generate and serve long-term branding communications in the form of interactive visual content to mobiles devices, such as smartphones, tablets, and smartwatches. Furthermore, the visual element can track such user interactions with an instance of the visual element and can generate metrics quantifying user engagement with visual content contained within the visual element based on such interactions, such as: a number of scroll-up and scroll-down events starting and terminating at a user's computing device with the visual element remaining within the window; and a number of complete forward replays of all frames in the image file at a speed less than a threshold speed indicating attentiveness of a user. Finally, by generating and inserting interactive visual media into a visual element placed inline with other content (e.g., a document, a webpage, a mobile application) such that the visual media can be scrolled past with gating access to the other content, the ad platform and the visual element can cooperate to serve relatively non-intrusive ad content to a user.

The first method S100 (and the second method S200) is described below as a method for generating and serving an interactive visual ad (and an interactive video ad) based on scroll events that move a visual element vertically within a window rendered on a display of a computing device. However, the first method S100 (and the second method S200) can be implemented to generate and serve any other type of visual content based on any other scroll or scroll-like input, such as horizontal scroll events or rotational or actuate gestures at a computing device.

1.3 Ad Serving

Various Blocks of the first method S100 can be executed by an ad platform hosted on a remote computer system, such as a remote server. The ad platform can: retrieve a digital video (e.g., a digital advertising video) from an internal or external database (e.g., a server or local file storage, such as browser client), such as over the Internet; extract select frames from the video ad automatically or under guidance from a human representative of an advertiser; and then transform these selected frames into a single static image file or into a video file upon selection of a subset of frames from the video ad. The ad platform can package the short with a visual element that can later be inserted inline within a document (e.g., a webpage or mobile application) and can make the short and visual element package (or "interactive visual ad") available for download by the advertiser; or upload the short and visual element package to an ad exchange, to a publisher ad server, to an advertising agency ad server, or to another content distribution network.

Later, when a user navigates to a publisher's webpage via a web browser or to a mobile application via a native application (hereinafter an "app") executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher ad tag that points the web browser or app to the publisher's ad server (e.g., a network of external cloud servers). The ad server can then implement an ad selector to select a particular ad to serve to the web browser or app and either: return the selected ad directly to the web browser or app; or return a second ad tag that redirects the browser or app to an advertiser or publisher's ad server. In the latter case, the advertiser or publisher ad server can return a third ad tag that redirects the web browser or app to a content delivery network, which may include a network of cloud servers storing raw creative graphics for the ad, and the content delivery network can return the selected ad to the web browser.

In the foregoing implementation, if the ad server selects the interactive visual ad, the ad server or content delivery network, etc. can return the short and the visual element package in the form of content within an HTML iframe element to the web browser or content within a view on the mobile application which can then place the iframe element within the webpage or within the window of the app. The visual element can then seek through frames contained within the short based on the position of the visual element shown within a window rendered on a display of the user's computing device according to various Blocks of the first method S100.

1.4 Digital Video

Block S110 of the first method S100 recites accessing a digital video from a database in Block S110. Generally, in Block S110, the ad platform accesses a digital video file—such as from a local machine or local network or pulled from a remote server or remote database—for subsequent extraction of frames in Block S120.

In one implementation, the ad platform hosts an advertiser portal that can be accessed by a human representative of an advertiser to generate a custom short from existing video advertising content. For example, an advertiser can access an instance of the advertiser portal through a native application or through a web browser executing on a desktop computer, a laptop computer, a smartphone, or a tablet and then: upload a video ad stored in local memory on the computing device; navigate to a video ad stored at an external data storage service; or enter a URL for a video ad published online through the advertiser portal. In this example, the ad platform can retrieve or otherwise access a digital video, such as in MP3, MP4, MOV, or AVI formats, and load this digital video into a remote server in Block S110.

The ad platform can thus retrieve a digital video from an internal or external database, such as over the Internet. The digital video can thus: include visual content or audio and visual content; can span a particular duration of time, such as five second, 30 seconds, or one minute; and can be characterized by a particular frame rate, such as 24 frames per second, and a maximum file size, such as ten megabytes. However, the ad platform can implement any other method or technique to access a digital video of any other size, format, frame rate etc.

1.5 Frame Selection

Block S120 of the first method S100 recites selecting a subset of frames from the digital video, wherein the subset of frames includes a predefined number of frames from the digital video. Generally, in Block S120, the ad platform selects a subset of frames from the digital video that can then be assembled into a short in Block S130.

In one implementation, the ad platform extracts a static, predefined number of frames from the digital video. In one example, when a user rapidly scrolls (or "thumbs") through a webpage or other document viewed on a mobile computing device, the rate of scroll through the webpage may approximate a full height of the window rendered on the computing device in one second. To achieve refresh rate within the visual element—during a scroll event at the mobile computing device—that approaches a standard frame rate of twenty-four frames per second as a user rapidly scrolls through a section of the webpage containing the visual element, the ad platform can select twenty-four frames from the digital video.

Similarly, in the implementation described below in which the visual element loads and maintains a first frame between when a top row of pixels in the visual element enter the bottom of a window on a display of a computing device and when the visual element fully enters the bottom window and in which the visual element loads and maintains a last frame between when the visual element fully enters the top of the window and when a bottom row of pixels in the visual element exits the top of the window, the visual element may be indexing through frames in the short over a distance equal to a height of the window less a height of the visual element. Therefore, to achieve a frame rate of approximately twenty-four frames per second from when the visual element fully enters the bottom of the window to when the top edge of the visual element reaches the top of the window, the ad platform can instead select twenty frames from the digital video. However, the ad platform can select any other number of frames from the digital video spanning any other duration of the video ad.

Figure 2:
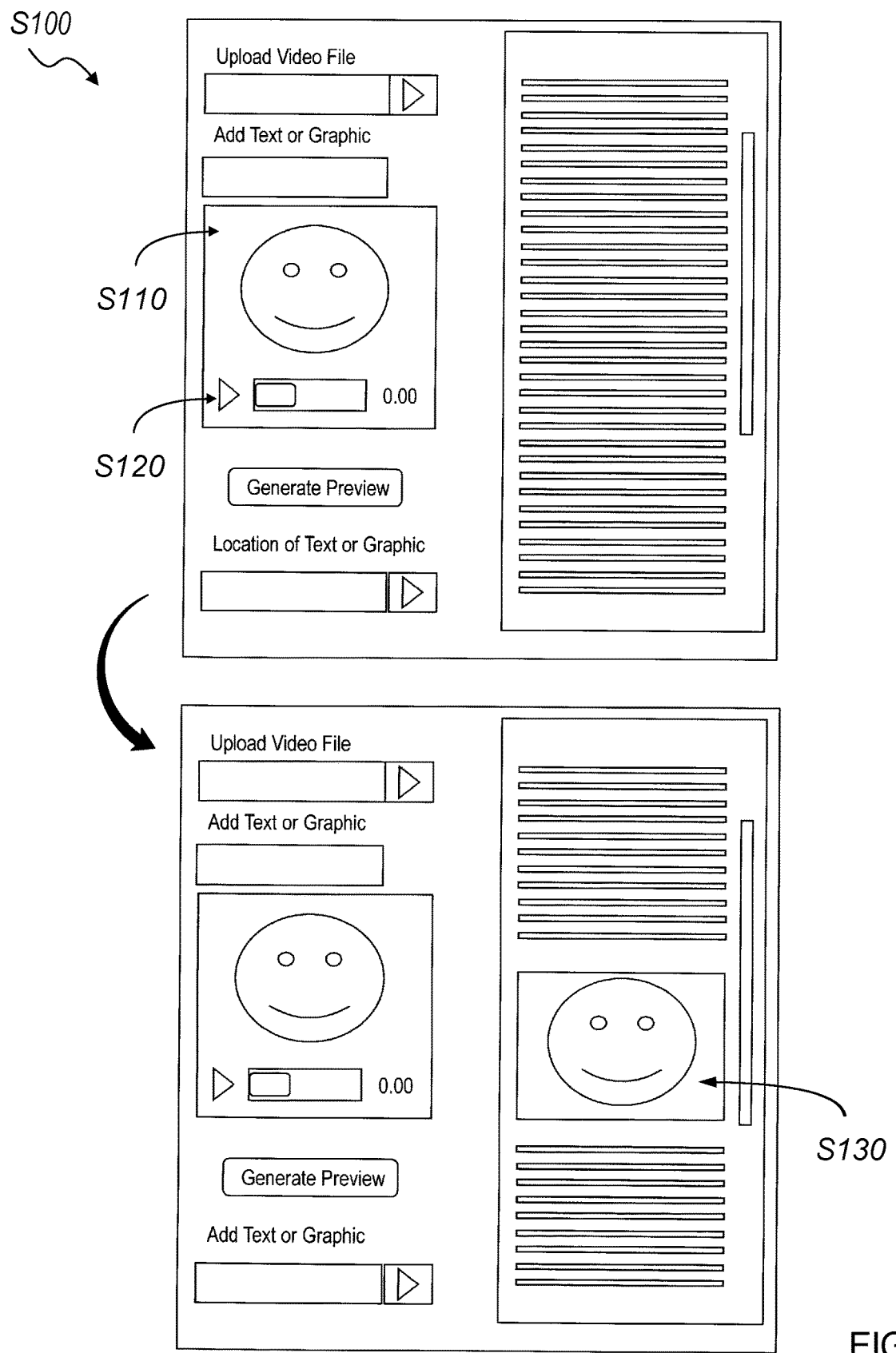
FIG. 2 is a flowchart representation of one variation of the first method.

As shown in FIG. 2, the ad platform can interface with a human advertiser or agent of the advertiser (e.g., a vendor) through the advertiser portal to select a particular subset of frames from the digital video in Block S120. In one implementation, the ad platform: renders a representation of frames in the digital video spanning the duration of the digital video within the advertiser portal; and selects a subset of frames distributed at uniform intervals across a section of the digital video between two markers positioned along the length of the representation of frames rendered within the virtual portal, as shown in FIG. 1. For example, the ad platform can: access a 30-second digital advertisement video containing 24 frames per second in Block S110; set a start marker at the first frame in the digital video; set an end marker at the last frame in the digital video; and then select twenty frames—from the approximately 720 frames in the video—at uniform intervals along the full length of digital video between the start and end markers (e.g., every approximately every 37th frame along the full length of the digital video) in Block S120. (The ad platform can also implement methods and techniques described below to generate a test short with this initial selection of twenty frames and can serve this test short via an instance of the visual element embedded into the advertiser portal for testing and review by the human advertiser.)

In this example, the human advertiser can then shift one or both of the start and end markers to narrow a section of the digital video represented in the selection of frames, and the ad platform can update the selection of frames accordingly. In particular, the ad platform can update the selection of the subset of frames from the digital video in response to manual relocation of one or both of the two markers relative to the representation of frames rendered within the advertising portal. For example, if the human advertiser shifts the start and/or end markers to span a one-second duration of the digital video, the ad platform can update the selection of frames to include frames 1-4,6-9, 11-14, 15-19, and 21-24 within the twenty-four frames spanned by the start and end markers in Block S120. (The ad platform can again implement methods and techniques described below to generate a second test short with this updated selection of twenty frames and can serve this second test short to the human advertiser through the instance of the visual element embedded into the advertiser portal for testing and review.) The ad platform can repeat this process over time as the human advertiser adjusts positions of the markers and until the human advertiser indicates that a final selection has been achieved.

In one implementation in which the ad platform loads a 30-second digital video in Block S110, the ad platform can select twenty (or any other number of) adjacent frames in a one-second segment of the digital video second video (e.g., spanned by the start and end markers) in Block S120 and can transform these frames into a short in Block S130 to achieve a smoothest transition between frames during playback within an instance of the visual element responsive to a scroll-down event at a computing device. However, this selection of twenty adjacent frames from the digital video may represent a shortest possible section of the digital video that may be contained within a short. Alternatively, the ad platform can select every other frame in a forty frame (e.g., approximately two-second) segment of the digital video, which may yield a short that, while exhibiting less continuous transitions between frames, spans a greater duration of the original digital video. Yet alternatively, the ad platform can select every tenth frame in a 240-frame (e.g., approximately eight-second) segment of the digital video, which may yield a short that, while exhibiting even rougher transitions between frames, spans a greater duration of the original digital video.

The ad platform can also enable the human advertiser to define multiple subregions of interest within the digital video and can select frames from each of these subregions of the digital video. For example, the ad platform can enable the human advertiser to select a position of a first pair of markers, a second pair of markers, and a third pair of markers, etc. along the discrete subsections of the digital video, and the ad platform can then select an equal number of frames from each subsection or select a number of frames from each subsection corresponding to each subsection's relative duration to total the predetermined number of (e.g., twenty) frames for the short. However, the ad platform can select any other number of frames at any other uniform or variable interval along one or more subsections of the digital video in Block S120.

The ad platform can additionally or alternatively enable the human advertiser to manually select particular frames from digital video in Block S120. Similarly, the ad platform can enable the human advertiser to upload discrete frames (such as static digital photographs or images) in Block S110, and the ad platform can aggregate and/or order these frames in Block S120. However, the ad platform can select or aggregate a set of frames for a short in any other way in Block S120.

1.6 Static Image File

Block S130 recites compiling the subset of frames into a single static image file. Generally, in Block S130, the ad platform assembles the set of frames selected in Block S120 into a singular image and stores this image as a static image file that can be rapidly uploaded to an instance of the visual element when a webpage or other document containing or pointing to the visual element is accessed by a computing device. The visual element can then select and render a particular subregion of the singular image containing visual content from a corresponding frame selected in Block S120 and corresponding to a range of vertical positions within the window occupied by the visual element, as described below; and the visual element can select and render alternate subregions of the singular image as the visual element moves vertically within the window in response to scroll events in Blocks S150, S152, S154, and S160, as described below. In this variation, the visual element can thus link each unique mask or crop area location within the singular image—corresponding to one frame in the set of frames selected in Block S120—to a unique range of positions occupied by the visual element within a window rendered on a display of a computing device, as described below.

In one implementation, the ad platform assembles the set of frames selected in Block S120 into a single column with tops and bottoms of adjacent frames abutted and stores this column of frames as a static image file. Furthermore, in this implementation, the ad platform can generate such a single static image file containing the set of frames adjoined in a single column in an order from bottom to top corresponding to an order of the set of frames within the digital video. The ad platform can also store metadata with the static image file, such as addresses of pixel row boundaries between adjacent frames or addresses of each corner pixel of each discrete frame represented in the singular image. The visual element can thus implement these metadata to locate a mask or crop area on the singular image corresponding to a current position of the visual element within a window rendered on a computing device in Blocks S150, S152, S154, and S160, as described below. The ad platform can also generate a callout for an order or sequence of frames represented within the singular image to render within a visual element as the visual element is scrolled from a bottom of a window to a top of a window and store this callout in metadata for the singular image. Furthermore, the ad platform can store a number of frames represented in the singular image, a creation data, creator information, a link (e.g., a URL) to an external destination, and/or any other relevant data in metadata of the singular image.

Alternatively, in Block S130, the ad platform can assemble frames selected in Block S120 into a single column or into a grid array, and the ad platform can arrange these frames in any other order, such as chronologically from left to right, chronologically from top to bottom, or arranged pseudorandomly. The ad platform can also store boundary, corner, center, or other positional definitions for the location of each discrete region of the singular image corresponding to a frame selected in Block S120.

In another variation, the ad platform assembles frames selected in Block S120 into a video file with each frame in the video file ordered chronologically, and the ad platform can then assign a unique timestamp (or serial number) to each frame. Upon insertion of an instance of the visual element and the video file into a webpage or other document in Block S140, the visual element can implement methods and techniques described below to link a unique timestamp (or serial number) corresponding to one frame in the video file to a unique range of positions occupied by the visual element within a window rendered on a display of a computing device navigating to the webpage. The visual element can thus seek forward, seek backward, and pause through frames in the video file as the visual element is moved up, moved down, and held in position within the window, respectively.

In yet another variation, the ad platform can store each frame selected in Block S120 as a static or still image, assign a serial number or other identifier to each still image, and generate a metadata file defining an order to the still image serial numbers. Upon insertion of an instance of the visual element into a webpage or other document in Block S140, the visual element can preload each still image as a separate file, load the metadata file, and then implement methods and techniques described below to link a unique serial number corresponding to one still image to a unique range of positions occupied by the visual element within a window rendered on a display of a computing device navigating to the webpage. The visual element can thus selectively cycle through multiple discrete still image files as the visual element is moved up and down within the window.

Upon final selection of frames from the digital video (or other visual media) and finalization of the short, the ad platform can upload the short to an ad exchange, to a publisher ad server, to an advertising agency ad server, or to another content distribution network. The ad platform can package the single image file (or video file or set of still images) with the visual element—including definitions for geometry, triggers for exchanging visual content based on position within a window, and a pointer (e.g., a URL) to an external destination, etc.—into an interactive visual ad that can be served to a webpage, mobile application, or other document later accessed by a user through a smartphone, tablet, smartwatch, or other computing device.

However, in Block S130, the ad platform can store frames selected in Block S120 in any other format, in any other one or more static image or video files, and with any other metadata. Furthermore, the foregoing methods and techniques can be executed locally at the advertising portal (e.g., rather than at a remote server or remote computer system hosting the ad platform), such as within a web browser or native application executing on a computing device accessing the advertising portal.

1.7 Loading a Short and Short Setup

As shown in FIG. 3, one variation of the first method S100 includes Block S140, which recites loading the image file onto the computing device. (Block S140 can similarly recite, at a visual element inserted into a document accessed by a computing device, loading the container from a remote database.) Generally, in Block S140, an instance of the visual element and the static image (or the video file or set of still images) generated in Block S130 is loaded into a document (e.g., a webpage) accessed by a web browser or other native application executing on a local computing device, such as a smartphone, tablet, or smartwatch.

As described above, when a user navigates to a publisher's webpage via a web browser executing on her smartphone, tablet, or other computing device, a web server hosted by the publisher can return content or pointers to content for the webpage (e.g., in Hypertext Markup Language, or "HTML"), including formatting for this content and a publisher ad tag that points the web browser to the publisher's ad server (e.g., a network of external cloud servers). The ad server can then implement an ad selector to select an instance of the interactive visual ad to serve back to the webpage based on the ad tag. For example, because the interactive visual ad is configured to respond to scroll inputs by exchanging visual content based on a position of the visual element within a window rendered on a display of a computing device, the ad selector can select the interactive visual ad only if the webpage is of sufficient height to enable the visual element to be scrolled from outside the window, to the bottom of the window, up to the top of the window, and then back out of the window during one or more scroll events. In particular, in Block S130, the ad platform can write limitations to the interactive visual ad to specify that the interactive visual ad is available for insertion into a webpage only if the webpage contains content spanning a height greater than five times the height of the visual element. The ad selector can also select the interactive visual ad based on various other parameters, such as the user's demographic, location, or products recently viewed on an e-commerce site, etc.

The publisher's ad server can then return the interactive visual ad (e.g., the short and/or the visual element in the form of content in an HTML iframe) directly to the web browser or as content in a view within a publisher's native mobile application. Alternatively, the publisher's ad server can return a second ad tag that redirects the browser (or mobile application) to a marketing ad server; the marketing ad server can return a third ad tag that redirects the web browser to a content delivery network; and the content delivery network can return the interactive visual ad to the web browser (or app).

By returning the interactive visual ad to the webpage, the publisher can thus insert the visual element into the webpage accessed by a web browser executing on a user's computing device. In particular, the web browser can insert the interactive visual ad below the top of the webpage and above the bottom of the webpage: in order to enable the user to scroll down to bring the interactive visual ad into view within the window rendered on the display of the computing device; and in order to enable the user to scroll down further to remove the interactive visual ad from the window. For example, the publisher can insert the interactive visual ad into the webpage with sufficient offset from the top and bottom of the webpage, such as at least a full height of the window between the top of the webpage and the top edge of the interactive visual ad. Alternatively, the ad selector can confirm that the position of the ad tag within the webpage meets these requirements before serving the interactive visual ad back to the web browser, and the web browser can insert the interactive visual ad into the webpage at the location defined by the ad tag. The web browser can alternatively insert the interactive visual ad at or near the top of the webpage to enable the user to control content shown in the visual element as the user scrolls down to view other content within the webpage.

Once loaded onto a webpage, the visual element can initiate a setup routine. In the variation described above in which the short includes a singular image in a static image file, the visual element links the position of a crop area or mask on the singular image—corresponding to one frame selected in Block S120—to a limited range of vertical positions of the visual element within the window rendered on the computing device. For example, for the singular image that includes representations of each frame abutted and arranged in a single column, the visual element can: pull a window height value (e.g., in number of pixels) from the web browser; extract a number of (e.g., twenty) frames represented in the singular image from metadata contained in the static image file; define a start position half the height of the visual element above the bottom edge of the window; define an end position half the height of the visual element below the top edge of the window; and then segment the vertical distance between the start position and the end position into a number of discrete, adjacent, and non-overlapping position ranges equal to the number of frames represented into the singular image. (Similarly, the visual element can segment the vertical distance between the start position and the end position into a number of discrete, adjacent, and non-overlapping position ranges equal to two less than the number of frames in the representation into the singular image, given that the first and last frames represented in the singular image are assigned a vertical position range below the start position and a vertical position range above the end position, respectively.) In this example, the visual element can also: extract boundaries between adjacent frame representations in the singular image from image file metadata, such as in the form of pixel addresses for the corners of each frame representation or a pixel address for the center of each frame representation in the singular image; and then sequentially assign—in order from bottom to top—each position range to one bounded region of the singular image containing a representation of a corresponding frame. (Alternatively, the ad platform can calculate window position ranges, assign these position ranges to discrete regions of the singular image, and store these assignments in metadata contained in the static image when the interactive visual ad is generated in Block S130.)

Figure 8:
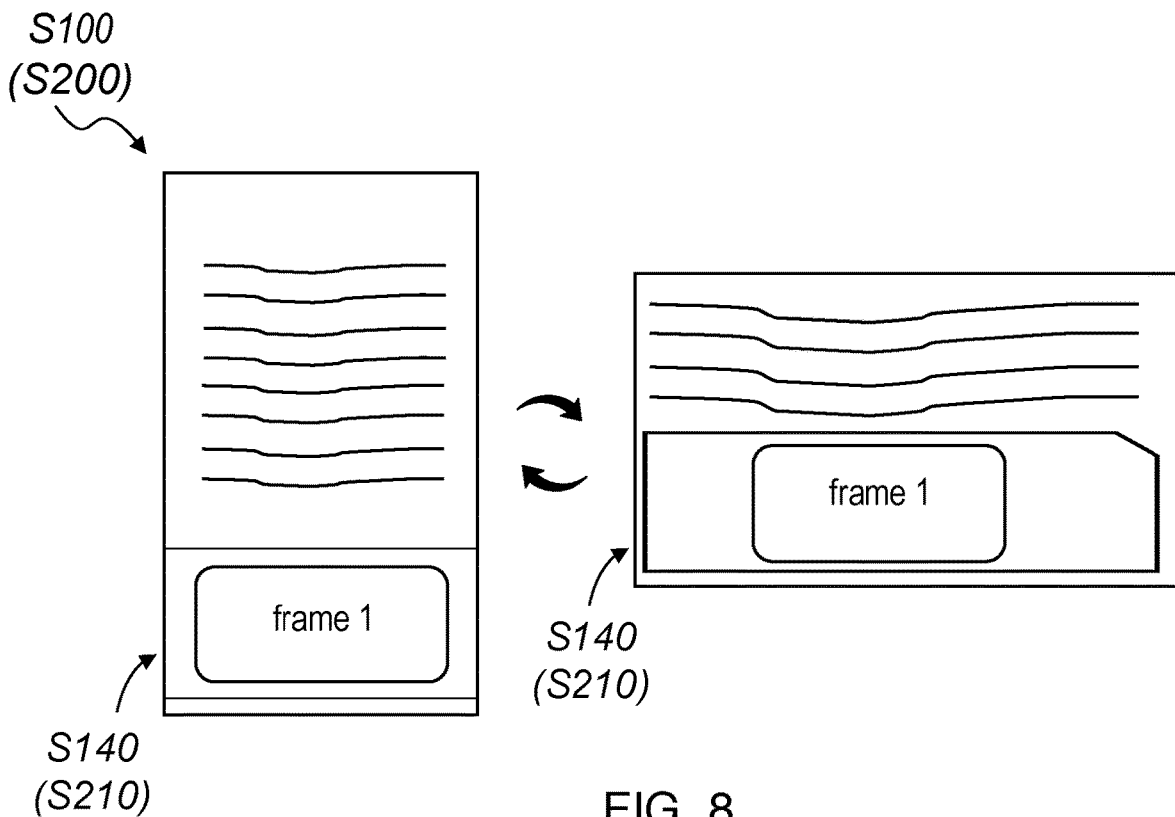
FIG. 8 is a flowchart representation of one variation of the first and second methods.
Figure 9:
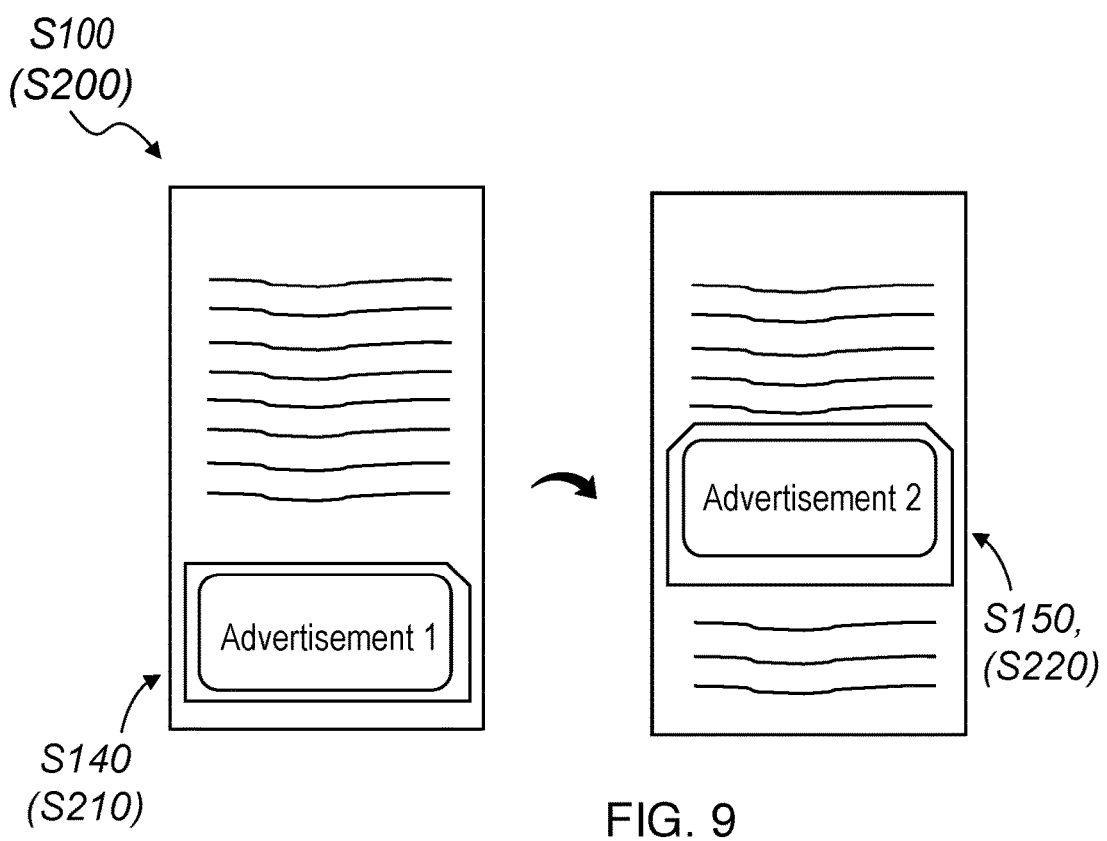
FIG. 9 is a flowchart representation of one variation of the first and second methods.

The visual element can also resize the singular image—at a locked aspect ratio—to achieve a greatest fill area for visual content loaded into the visual element without skewing this content. For example, the visual element can: pull its current width and height (e.g., in number of pixels) from the webpage or from the web browser; resize the singular image to fill the greatest area of the current instantiation of the visual element; and then implement methods and techniques described above to reassign vertical position ranges within the window to each region of a singular image containing a representation of a frame selected in Block S120, as shown in FIG. 9. The visual element can repeat this process over time while the website is shown within the browser, such as if the user zooms into or out of the webpage or if the user transitions the computing device from a landscape orientation to a portrait orientation (or vice versa), as shown in FIG. 8.

In the variations above in which the ad platform generates a short that includes one video file or that includes multiple still images contained in discrete still images files, the visual element can implement similar methods and techniques to resize this visual content and to assign frames in the video file or still images to discrete vertical position ranges within the window. However, the visual element can implement any other method or technique to: resize visual content contained in the short; to segment a height of the window (less a height of the visual element) into a number of discrete vertical position ranges equal to the number of frames in the set of frames selected in Block S120; and to assign each discrete vertical position range to one region of the image file, to one frame in the video file, or to one still image in the set of still images corresponding to one frame in the set of frames.

1.8 Scrolling

With the visual element thus loaded into a webpage or other document, the visual element then updates content shown within the visual element based on the position of the visual element within a window rendered on the computing device. In particular, as the webpage containing the visual element is moved up and down (or left and right) within the window, the visual element indexes through regions of the singular image, through frames in the video file, or through still images corresponding to frames selected from the digital video in Block S120 based on changes to the position of the visual element relative to the window, such as due to scroll-down and scroll-up inputs entered by the user into the computing device.

In one implementation, the visual element retrieves a relative position of the visual element within the window from the web browser (or other native application) hosting the webpage or other document in which the interactive visual ad is embedded. For example, the visual element can regularly query the web browser (or other native application) for its position relative to the window or display, such as at a rate of 24 Hz, and the web browser can return the position of the visual element (e.g., a top-left pixel of the visual element) relative to a reference position of the window (e.g., a top left pixel of the window). Alternatively, the visual element can regularly: query the web browser for scroll position of the webpage relative to the window, dimensions (e.g., pixel height and width) of the webpage, and window dimensions from the web browser; and calculate its position within the window from these data. Yet alternatively, the web browser can push one or more of these data to the visual element, such as at a regular rate or intermittently in response to an input (e.g., a scroll input) into the computing device. However, the visual element can determine its position within the window over time in any other way and based on any other data received from the web browser (or other native application).

Upon determination or receipt of a new relative position of the visual element within the window, the visual element can preserve a particular region of the static image file (or the current frame in the video file or the current still image) currently loaded into the visual element if the range of vertical positions assigned to the particular region of the static image file contains the new relative position of the visual element. However, if the range of vertical positions assigned to the particular region of the static image file does not contain the new relative position of the visual element, the visual element can replace the particular region of the static image file currently loaded into the visual element with a different region of the static image file (or with a different frame in the video file or with a different still image) assigned a range of vertical positions that does include the new relative position of the visual element within the window.

By repeating this process over time while the webpage containing the visual element is open within the web browser, the visual element can cycle through frames represented in the short in Blocks S150, S152, S154, and S160 in response to scroll events occurring within the web browser that move the visual element relative to the window rendered on the computing device. Such position-driven updates with the visual element can manifest: as forward playback of a segment of the digital video represented in the short at a frame rate corresponding to a speed at which the visual element is drawn from a bottom of the window toward the top of the window (i.e., a "scroll-down event"); as a rewind function or reverse playback of the same segment of the digital video at a frame rate corresponding to a speed at which the visual element is drawn from a top of the window toward the bottom of the window (i.e., a "scroll-up event"); and as pausing playback of the segment of the digital video in the absence of a scroll event at the window.

1.8.1 Scroll-Down Event

Block S150 of the first method S100 recites, at a first time, in response to a first scroll-down event that moves a visual element into view at a bottom of a window rendered on a display of the computing device, inserting a first region of the image file corresponding to a first frame in the subset of frames into the visual element. Block S152 of the first method S100 recites, at a second time succeeding the first time, inserting a second region of the image file into the visual element in response to a second scroll-down event that moves the visual element to a second position above the bottom of the window in Block S152, the second region of the image file corresponding to a second frame succeeding the first frame in the subset of frames. Block S154 of the first method S100 recites, at a third time succeeding the second time, inserting a last region of the image file into the visual element in response to a third scroll-down event that moves the visual element to a top of the window in Block S154, the last region of the image file corresponding to a last frame succeeding the second frame in the subset of frames.

Blocks S150, S152, and S154 can similarly recite, at the visual element inserted into a document (e.g., webpage) accessed by a computing device: during a scroll-down event at the computing device, rendering a first frame, from the container, between when a top edge of the visual element first enters a window rendered on a display of the computing device and when the visual element is shown in full at the bottom of the window in a first position; during the scroll-down event, rendering a second frame, from the container, in replacement of the first frame in response to relocation of the visual element from the first position to a second position within the window above the first position; and, during the scroll-down event, rendering a last frame, from the container, in response to relocation of the visual element to a top position within the window above the second position. Generally, the visual element can execute Blocks S150, S152, and S154 during a scroll-down event (i.e., as the visual element is repositioned toward the top of the window) to seek chronologically forward through frames represented in the short, as shown in FIG. 3.

In one implementation in which the short includes a single static image file containing a singular image (e.g., one JPEG file) containing visual content from each frame selected in Block S120, when the visual element is moved within the window, the visual element can relocate an image mask (or crop area) on the singular image based on the new vertical position of the visual element within the window and then load the region of the singular image bounded by the mask. For example, when the user navigates to the webpage and the visual element is loaded into the webpage, the window rendered on the display of the computing device can contain a top section of the webpage above and excluding the visual element; and the visual element can locate the mask over a first region of the singular image corresponding to the first frame in the short and preload the first region of the singular image in Block S150. As the user later scrolls down to view lower content in the webpage, the visual element—showing the first region of the singular image—may come into view at the bottom of the window, beginning with the top row of pixels of the visual element. (Alternatively, in Block S150, the visual element can load the first region of the singular image file into the visual element in real-time in response to entry of a top edge (e.g., a top row of pixels) of the visual element into the bottom of the window during a scroll-down event) The visual element can then maintain the first region of the image file statically within view until the visual element reaches a second position or a second vertical position range within the window.

Once a sufficient height of the visual element is shown within the window (e.g., 75% of or 100% of the height of the visual element, such as corresponding to the start position described above)—that is, once the visual element reaches a second vertical position within the window contained within a second vertical position range assigned to a second frame represented in the singular image—the visual element can relocate the mask over a second region of the singular image corresponding to the second frame and load this second region of the singular image in replacement of the first region of the singular image in Block S152, as shown in FIG. 3. During the same or subsequent scroll-down event, the visual element can preserve the second region of the visual element in view until the position of the visual element moves into a third vertical position range assigned to a third frame represented in the singular image, at which time the visual element can relocate the mask over a third region of the singular image corresponding to the third frame and load this third region of the singular image in replacement of the second region of the singular image. The visual element can repeat the process as the user continues to scroll down through the window. However, once the position of the visual element reaches the end position described above (e.g., once a top edge of the visual element reaches or is shifted above the top of the window or once 25% of the height of the visual element has been shifted beyond the top of the window), the visual element can relocate the mask over a final region of the singular image corresponding to a final frame selected in Block S120, load this final region of the singular image in replacement of a previous region of the singular image, and preserve the final image in view until the visual element is scrolled fully past the top of the window in Block S154.

The visual element can therefore: position a mask or crop area over a first region of the image file linked to a first range of positions of the visual element rendered proximal the bottom of the window in Block S150; index the crop area over a second region of the image file linked to a second range of positions of the visual element above the first range of positions within the window in Block S152; and index the crop area over the last region of the image file linked to a third range of positions of the visual element above the second range of positions within the window.

The visual element can execute Blocks S150, S152, and S154 during a single, continuous scroll-down event that draws the visual element into view at the bottom of the window, up toward the top of the window, and then out of the window. Alternatively, the visual element can execute Blocks S150, S152, and S154 over the course of two or more scroll-down events, such as over back-to-back scroll-down events or over a sequence of scroll-down events interspersed with one or more scroll-up events.

In one implementation in which the short includes a video file containing multiple timestamped frames, in response to relocation of the visual element to a new position within the window during a scroll event, the visual element can implement similar methods and techniques to load a particular frame—from the video—assigned to a particular vertical position range containing the current vertical position of the visual element within the window. Alternatively, in the implementation described above in which the short includes a set of still images stored in discrete files, the visual element can implement similar methods and techniques to load a still image—from the set of still images—assigned to a particular vertical position range containing the current vertical position of the visual element within the window when the visual element is relocated within the window during a scroll event.

However, the visual element can implement any other method or technique to sequentially load representations of frames selected in Block S120 in real-time during scroll-down events occurring at the computing device.

1.8.2 Scroll-Up Event

Block S160 of the first method S100 recites, at a fourth time succeeding the third time, inserting the second region of the image file into the visual element in response to a scroll-up event that moves the visual element to the second position of the window in Block S150, the second region of the image file corresponding to a second frame succeeding the first frame in the subset of frames. (Block S160 can similarly recite, in response to a scroll-up event at the computing device, rendering the second frame in response to relocation of the visual element from the top position to the second position within the window.) Generally, in Block S160, the visual element can implement methods and techniques like those in Blocks S150, S152, and S154 to load representations of frames selected in Block S120—in sequential, reverse order—in real-time during scroll-up events at the computing device in which the visual element is drawn toward the bottom of the window.

The visual element can therefore load representations of frames contained in the short based on the position of the visual element within the window during scroll events that move the visual element into the window, up or down (or side-to-side) within the window, and out of the window, as shown in FIG. 4. However, the visual element can implement any other method or technique to vary content shown within the visual element based on the position of the visual element within the window.

1.9 Metrics

As shown in FIG. 1, one variation of the first method S100 further includes Block S170, which recites: at the visual element, generating an interaction record including a number of scroll-down events and scroll-up events occurring at the computing device and maintaining the visual element within the window; and serving the interaction record to a remote database. Generally, In Block S170, the visual element (e.g., the interactive visual ad, or the ad platform) collects data related to interactions between the interactive visual ad and a user viewing the interactive visual ad on a computing device and packages these interaction data into one or more metrics indicative of user engagement with the interactive visual ad. In particular, because the visual element updates content shown within the interactive visual ad based on the position of the visual element within a window rendered on a display of a computing device—that is, in response to scroll-down and scroll-up events at the computing device—the visual element (or the ad platform) can generate metrics for user engagement with the interactive visual ad enabled by user controls integrated into the visual element.

In one implementation, the visual element maintains counts of: a number of scroll-down and scroll-up events occurring at the computing device while all or a portion of the visual element is shown in the window; a number of back-to-back scroll-down and scroll-up event pairs (or scroll direction changes); a number of discrete scroll events at scroll speeds less than a threshold scroll speed or within a scroll speed range corresponding to historical peak user engagement; and/or a number of times the visual element enters and exits the window; etc. The visual element can also track: a duration of time that the visual element is shown within the window while the webpage or other document is accessed at the computing device; and a click-through event, including whether the user selected the interactive visual ad to navigate to a destination URL stored in visual element metadata, as described above.

The visual element can also quantify or qualify a user's interactions with content in the visual element based on a duration and/or number of frames of the interactive video ad rendered within the visual element while the user accesses the webpage. For example, the visual element can classify user interaction with the interactive visual ad as: "no engagement" if the user rapidly (e.g., faster than a threshold speed) scrolls the visual element from the bottom of the window to the top of the window and does not revisit the visual element; "limited engagement" if the user slowly scrolls from the visual element up from the bottom of the window to midway within the window and then rapidly scrolls the visual element up past the top of the window; "moderate engagement" if the user slowly (e.g., slower than a threshold speed) scrolls the visual element from the bottom of the window to the top of the window; "good engagement" if the user scrolls up and then scrolls down once the visual element enters the window; and "excellent engagement" if the user scrolls up and scrolls down more than once following entry of the visual element into the window.

The visual element can also track and characterize the speed of scroll events entered by the user when the visual element is loaded onto a webpage or other document. For example, the visual element (or the ad platform) can: detect a rapid scroll-down event that first brings the visual element into view within the window, followed by a slower scroll-up event to bring the visual element back up toward the top of the window, followed by a scroll-down event to view other content on the webpage; and the visual element can implement pattern recognition techniques to correlate this pattern of scroll events with user interest in the interactive visual ad and its content. The visual element can also record a number of scroll-down and scroll-up event pairs between the first scroll-up event and last scroll-down event—with the visual element remaining within the window—and characterize a level of user engagement with the interactive visual ad that is proportional to this number of scroll-down and scroll-up event pairs.

The visual element can then package any one or more of the user engagement metrics in Block S170 and return these user metric data to the publisher, advertiser, or other entity. Alternatively, the visual element can return raw interaction data (e.g., scroll event counts) as described above to the ad platform, and the ad platform can transform these raw interaction data into one or more user engagement metrics in Block S170 and then serve these engagement metrics to one or more external entities. However, the visual element and/or the ad platform can generate and handle user engagement metrics of any other type in any other suitable way.

2. Second Method

Figure 5:
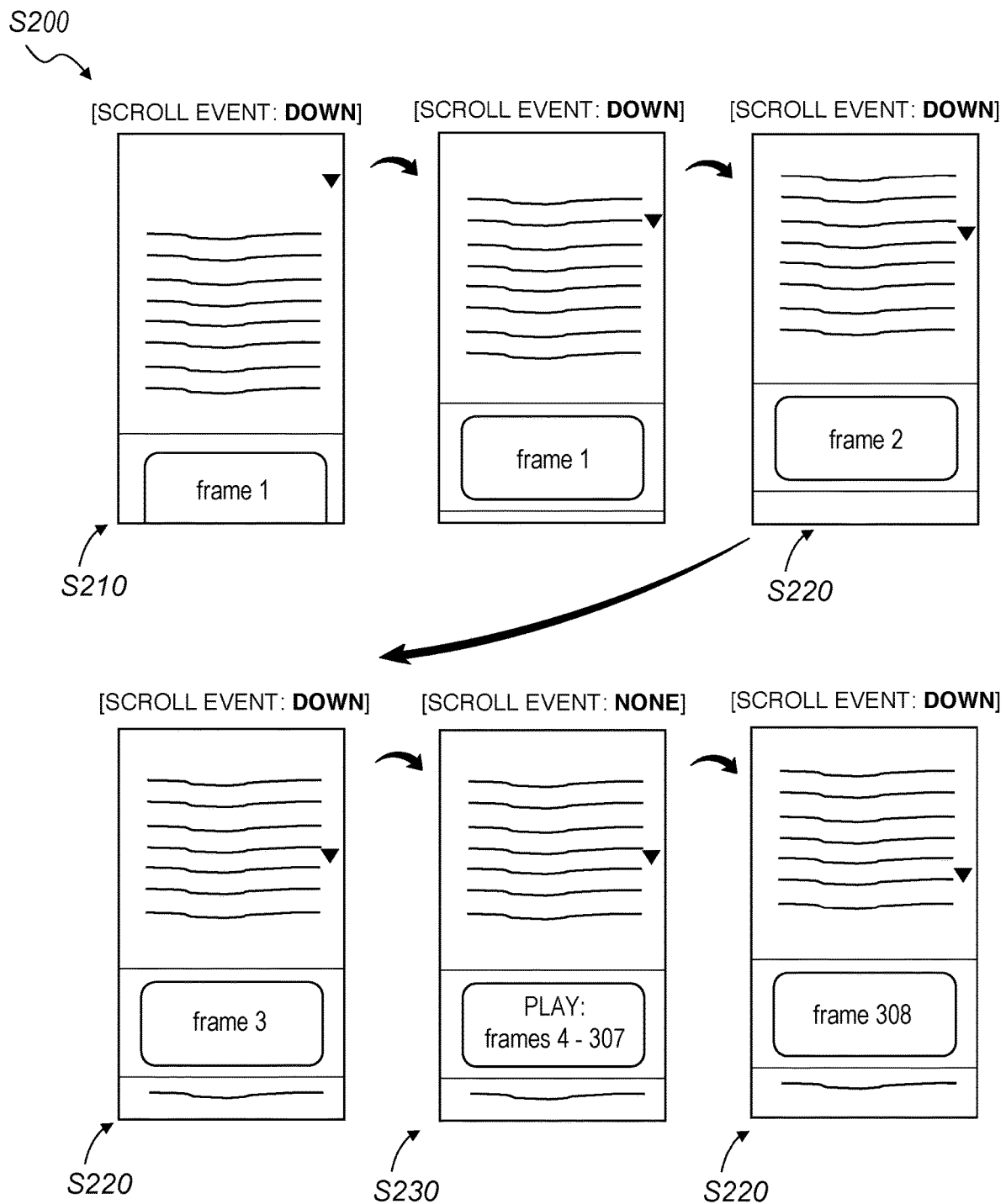
FIG. 5 is a flowchart representation of a second method.

As shown in FIG. 5, a second method S200 for serving interactive content to a user includes, at a visual element inserted into a document accessed by a computing device: loading a first frame from a digital video in Block S210; in response to a scroll-down event that moves the visual element upward from a bottom of a window rendered on a display of the computing device toward a top of the window, seeking from the first frame through a first subset of frames in the digital video in a first direction at a rate corresponding to a scroll rate of the scroll-down event in Block S220, the first subset of frames spanning a duration of the digital video corresponding to a length of the scroll-down event; and, in response to termination of the scroll-down event with the visual element remaining in view within the window, replaying the digital video forward from a last frame in the first subset of frames in the digital video loaded into the visual element in Block S230.

2.1 Applications

Generally, the second method S200 can be executed by a visual element—such as an instance of the visual element described above—loaded onto a webpage or other document to both replay a video advertisement once the visual element comes into view within a window rendered on a computing device and to enable a user to seek forward, to seek backward, and to pause the video advertisement by scrolling up and down through the webpage while the visual element is within the window. In particular, when executing Blocks of the second method S200, the visual element can implement methods and techniques similar to those of the first method S100 described above to: detect changes to the position of the visual element within the window response to a scroll input; and to cycle forward and backward through frames in a video advertisement at a rate and in a direction corresponding to a rate and a direction of the scroll input. However, when a scroll event at the computing device terminates with all or at least a portion (e.g., 75%) of the area of the visual element still contained within the window, the visual element can automatically initiate playback of the video advertisement, such as from a first frame in the video advertisement following entry of the visual element into the bottom window and/or from a last frame loaded into the visual element during a last scroll event.

Therefore, the visual element can execute Blocks of the second method S200 to enable seek forward and seek backward functions—over a limited duration of a video ad—during playback of the video ad responsive to scroll events that move the visual element within the window, and the visual element can resume playback of the video ad within the window upon termination of a scroll event. In particular, once loaded into the webpage or other document, the instance of the visual element can execute Blocks of the second method S200 to selectively play the video advertisement when the visual element is stationary within a window rendered on a display of the computing device and to selectively seek forward and backward through frames in the video advertisement based on scroll events occurring within the web browser.

2.2 Video Ad and Ad Serving

Like the digital video described above, the video advertisement: can include a digital video, such as in MP3, MP4, MOV, or AVI formats; can include a particular number of frames per second of video (e.g., twenty-four frames per second); and can span a particular duration, such as fifteen second or thirty seconds. As described above, the ad platform can enable a human representative of an advertiser to manually select the video advertisement and to configure the interactive video ad with an advertiser portal. For example, through the advertiser portal, the human advertiser can; upload a video ad stored in local memory on the computing device; navigate to a video ad stored at an external data storage service; or enter a URL for a video ad published online. Once configured within the advertiser portal, the ad platform can upload the visual element (e.g., in the form of an HTML iframe) and the video ad (i.e., the "interactive video ad") to a publisher ad server, an advertising agency ad server, or a content distribution network, etc., as described above.

As in the first method S100 described above, the publisher ad server, the advertising agency ad server, or the content distribution network, etc. storing the interactive video ad can also distribute an instance of the interactive video ad to a web browser (or other native application) executing on a computing device when the web browser navigates to a webpage or other document containing an ad tag. The publisher ad server, the advertising agency ad server, or the content distribution network, etc. can also upload the entire video ad to the computing device or can "drip feed" frames of the video ad to the computing device, as described below.

2.3 Visual Element Initialization

Block S210 of the second method S200 recites, at the visual element inserted into a document, loading a first frame from a digital video. Generally, in Block S210, the visual element preloads a first frame of the video ad before the visual element enters the window displayed on the computing device or loads the first frame of the video once substantially in real-time as the visual element enters the window (e.g., from the bottom of the window upward during a scroll-down event).

In one implementation, the visual element is inserted into a webpage below the top of the webpage and above the bottom of the webpage, as described above. Once inserted into the webpage (or once a portion of the visual element first comes into view within the window), the visual element queries the content distribution network (or other remote database) for the first frame in the video ad. Upon receipt of the first frame, the visual element loads the first frame. The visual element can also preserve the first frame in view within the window as the visual element first enters the bottom of the window during a first scroll-down event and until a minimum area of the visual element is shown within the window (e.g., 75% or 100% of the height of the visual element), as described above.

2.4 Scroll-Down Event

Block S220 of the second method S200 recites, in response to a scroll-down event that moves the visual element upward from a bottom of a window rendered on a display of the computing device toward a top of the window, seeking from the first frame through a first subset of frames in the digital video in a first direction at a rate corresponding to a scroll rate of the scroll-down event in Block S220, wherein the first subset of frames spans a duration of the digital video corresponding to a length of the scroll-down event. Generally, in Block S220, the visual element implements methods and techniques similar to those described above to seek forward through frames in the video ad as the visual element is moved into the window and then from the bottom of the window up during a scroll event. In particular, the visual element can seek forward through a number of frames in the video ad corresponding to a distance that the visual element is moved upward within the window during the scroll-down event, and the visual element can cycle from one frame to the next at a rate corresponding to a rate of the scroll-down event.

In one implementation, upon insertion into the webpage (or other document), the visual element queries the web browser for dimensions of the window (e.g., a height of the window in pixels) and a height of the visual element within the window and then segments the height of the window into discrete vertical position ranges. In this implementation, when generating the interactive video ad, the ad platform can define a total number of frames through which an instance of the visual element is to index during a scroll event that moves the instance of the visual element across the full height of a window on a computing device and store this number of frames in interactive video ad metadata; once loaded into a webpage, the instance of the visual element can segment the height of the window into this number of discrete vertical position ranges. For example, the ad platform can specify that the visual element seek through twenty frames as the visual element is scrolled from the bottom of the window to the top of the window (or vice versa) and store this value in visual element metadata; once loaded into the webpage, the visual element can: define a first vertical position range spanning half the height of the visual element below and half the height of the visual element above the bottom edge of the window; define a last vertical position range spanning half the height of the visual element below and half the height of the visual element above the top edge of the window; and segment the distance from the first vertical position range to the last vertical position range into eighteen equal-height vertical position ranges.

Furthermore, once loaded in to the webpage, the visual element can query the web browser for its location relative to the window, receive push notifications of its position relative to the window from the web browser, calculate its position relative to the window based on other data retrieved from the web browser, or calculate or track its position relative to the window in any other way. Thus: as the center of the visual element transitions into the first vertical position range, the visual element can call and load a first frame from the video ad; as the center of the visual element transitions from the first vertical position range into a second vertical position range, the visual element can call and load a second frame succeeding the first frame; and as the center of the visual element transitions from the second vertical position range into a third vertical position range, the visual element can call and load a third frame succeeding the second frame; etc. during a single scroll-down event. In particular, by segmenting the height of the window into discrete vertical position ranges and linking forward transitions from one frame in the video ad to a next frame in the video ad to movement of (the center of) the visual element from one vertical position range to a next vertical position range thereover, and by progressing through frames in the video ad as the visual element is moved upward from the bottom of the window during a scroll-down event, the visual element can enable seek forward functions within both duration and speed of a seek forward event controlled by the length and rate of a scroll down event. In the foregoing example in which the ad platform defines transition across twenty frames from the bottom of the window to the top of the window for a 30-second video ad characterized by a frame rate of twenty-four frames per second, the visual element can thus enable a user to seek forward through the first second of the video ad by scrolling the visual element from the bottom of the window to the top of the window. The visual element can similarly enable a user to seek forward through the first half-second of the video ad by scrolling the visual element from the bottom of the window to the middle of the window. (However, the ad platform can define any other number of frame transitions spanning the full height of a window in the visual element metadata, such as 48 frames to achieve a full two-second seek forward duration or 10% of the total number of frames in the video ad.)

The visual element can also enable the user to seek forward through other segments of the video ad. As described below, once a last scroll event is terminated at the computing device with the visual element still shown within the window, the visual element can replay the video ad at full speed (e.g., as an original frame rate) beginning with a last frame shown in the visual element during the last scroll event until the video ad is completed or until a subsequent scroll event is entered at the computing device. If another scroll-down event occurs at the computing device, the visual element can stop playback of the video ad and then implement methods and techniques described above to index forward through subsequent frames in the video as the visual element enters each subsequent vertical position range toward the top of the window.

For example, when a user navigates to a webpage, the webpage loads an instance of the visual element, and the user then scrolls down through the webpage, the visual element can load the first frame in the video ad and show this first frame while the visual element remains in the first vertical position range. As the user continues to scroll down and the visual element enters subsequent vertical position ranges, the visual element can load subsequent frames in the video ad. When the user terminates the scroll-down event with the visual element proximal the vertical center of the window and showing a tenth frame from the video ad, the visual element can begin playback of the video ad from the eleventh frame. When the user again scrolls down within the window approximately ten seconds later with the visual element showing the $250^{th}$ frame in the video ad, the visual element can cease playback of the video ad. If the user scrolls the visual element toward the top of the window and out of the window in this second scroll-down event, the visual element can exit the window showing the $260^{th}$ frame of the video ad. However, if the user later enters a scroll-up event to bring the visual element back into the window, the visual element can again show the $260^{th}$ frame (or load the $261^{st}$ frame) in the video ad while the visual element is moved through the top vertical position range within the window. The visual element can again resume playback of the video ad once the scroll-up event ceases, resuming at a last frame loaded into the visual element at the end of the previous scroll-up event. The visual element can continue this process of seeking through frames of the video ad in forward and reverse during scroll-down and scroll-up events and executing playback of the video ad while the visual element is within the window but no scroll event is current.

As described above, the visual element can load the entire video ad from the content distribution network (or other remote database) when the interactive video ad is served to the computing device, and the visual element can selectively present frames from this video ad—now stored locally on the computing device—according to Blocks of the second method S200. Alternatively, the visual element can preload a subset of frames of the video ad from the content distribution network to a buffer, such as a two-second buffer or a buffer spanning 10% of the duration of the video ad, and the visual element can selectively present frames stored locally in a buffer on the computing device according to Blocks of the second method S200. For example, the visual element can download and store a subset of frames of the interactive video ad in a buffer when a webpage—including the visual element—is accessed at a web browser and before the visual element is scrolled into view within the window of the web browser. Yet alternatively, the visual element can pull frames of the video ad from the content distribution network substantially in real-time. For example, when the visual element is first loaded into the webpage, the visual element can query the content distribution network for the first frame of the video ad; when the visual element enters a second vertical position range within the window during a scroll event, the visual element can query the content distribution network for the second frame of the video ad; and when the visual element enters a third vertical position range within the window during the scroll event, the visual element can query the content distribution network for the third frame of the video ad; etc. Once the visual element enters a particular vertical position range within the window, the visual element can also query the content distribution network for a previous frame and a next frame corresponding to vertical position ranges below and above the particular vertical position range now occupied by the visual element and store these previous and next frames in a buffer in preparation to show either the previous frame if a scroll-up event follows or the next frame if the scroll-down event continues or if the scroll event ceases and playback of the video ad from the current frame commences. However, the visual element can access frames of the video ad stored locally on or remotely from the computing device in any other way and selectively display these frames based on the position of the visual element within the window in any other suitable way.

2.5 Scroll-Up Event

Figure 6:
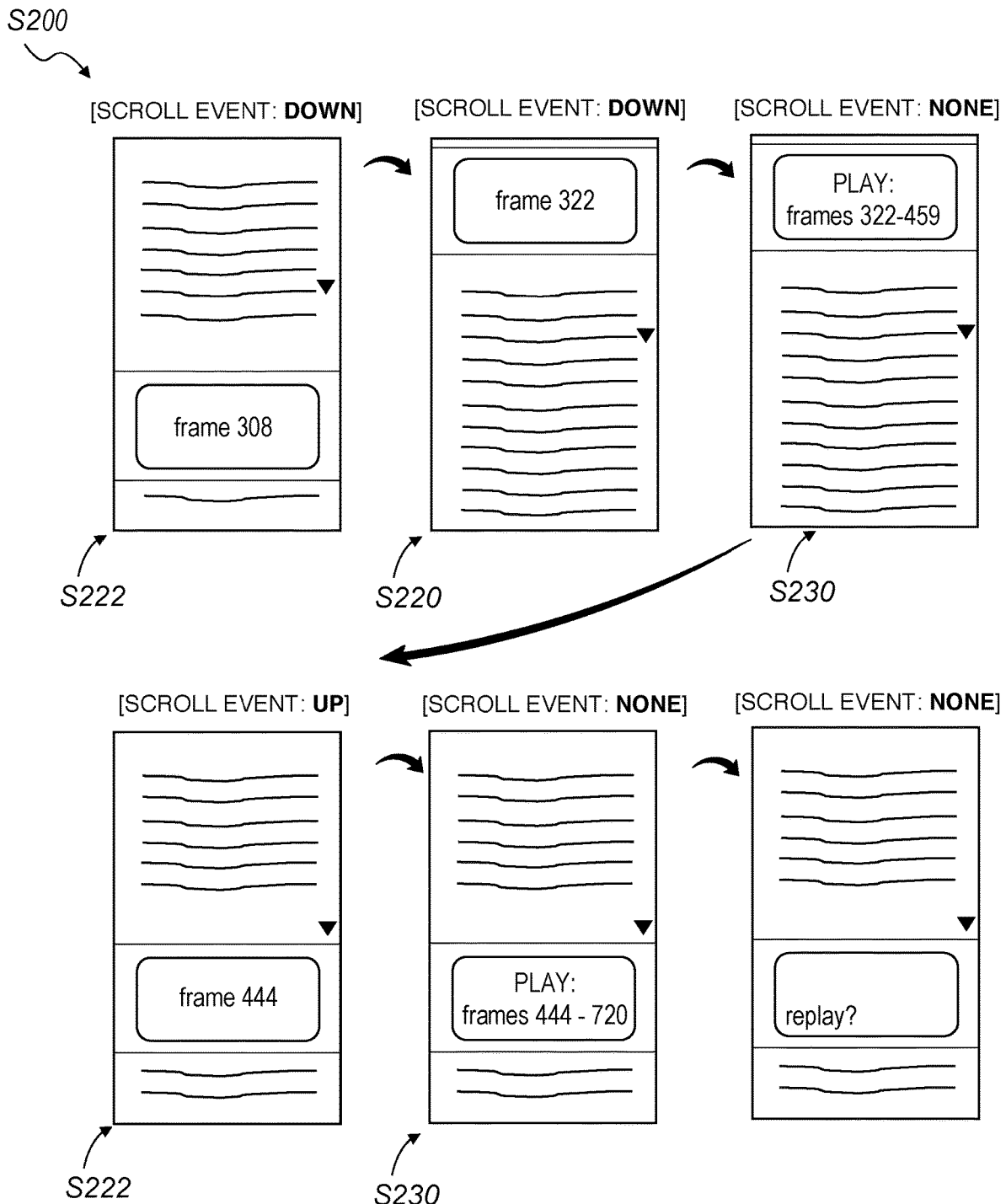
FIG. 6 is a flowchart representation of one variation of the second method.

As shown in FIG. 6, one variation of the second method S200 includes Block S222, which recites: in response to a scroll-up event that moves the visual element downward from proximal a top of the window toward the bottom of the window, seeking from a last frame loaded into the visual element through a second subset of frames in the digital video in a second direction at a rate corresponding to a scroll rate of the scroll-up event, the second subset of frames spanning a duration of the digital video corresponding to a length of the scroll-up event, the second direction opposite the first direction. Generally, in Block S222, the visual element implements methods and techniques similar to those in Block S220 described above to seek backward through frames in the video ad as the visual element is moved toward the bottom of the window during a scroll-up event. In particular, the visual element can seek backward through a number of frames in the video ad corresponding to a distance that the visual element is moved downward within the window during a scroll-up event, and the visual element can cycle from one frame to the next frame in the video ad at a rate corresponding to a rate of the scroll-up event. In particular, the visual element can execute Block S222, like Block S220 described above, to enable a seek backward function for the video ad controlled by the distance and rate of a scroll up event occurring at the computing device while the visual element is shown within the window.

2.6 Video Playback

Block S230 of the second method S200 recites, in response to termination of the scroll-down event with the visual element remaining in view within the window, replaying the digital video forward from a last frame in the first subset of frames in the digital video loaded into the visual element. Generally, in Block S230, the visual element functions to replay the digital video forward from a last frame shown within the visual element during a last scroll event in response to termination of the last scroll event with all or a portion of the visual element remaining in view within the window.

In one implementation, the visual element initiates playback of the video ad when at least a minimum area or minimum height (e.g., 75%) of the visual element is contained within the window and no scroll event is currently active at the computing device. However, the visual element can transition to frame selection control based on the position of the visual element within the window when a scroll event occurs. When less than a threshold area or height of the visual element is visible within the window, the visual element can also preserve a single image in view until a scroll event brings a sufficient area or height of the visual element into the window to trigger playback of the video ad.

Figure 7:
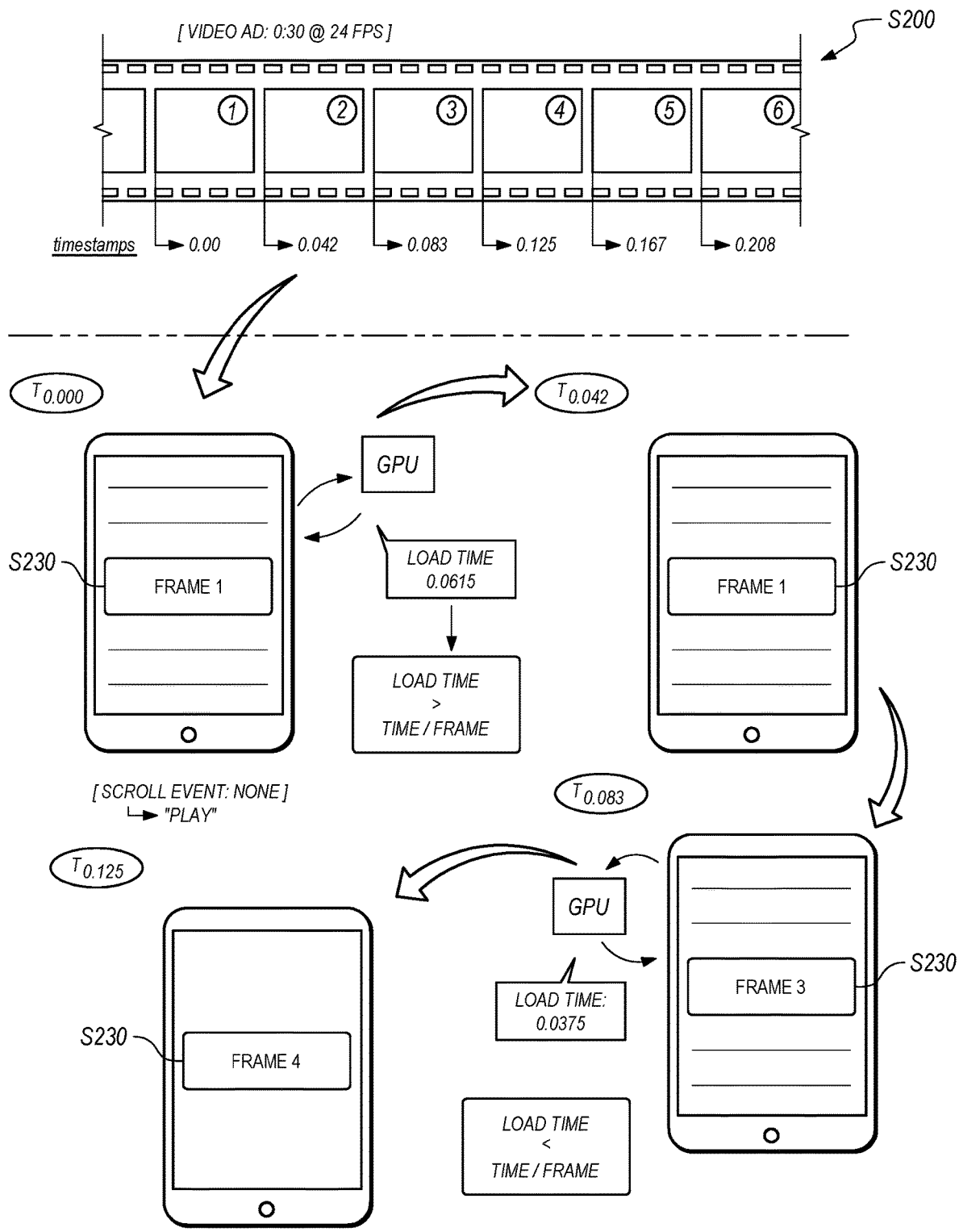
FIG. 7 is a flowchart representation of one variation of the second method.

During playback of the video, the visual element can implement closed-loop feedback to load a next frame of the video ad, as shown in FIG. 7. In one implementation, the visual element records a first duration of time from submission of a call for a first frame to display of the first frame within the window rendered on the display of the computing device and then identifies a next frame in the video ad to render based on this first duration. In particular, if the first duration is less than a time per frame of the video ad—such as less than a difference between timestamps of two adjacent frames in the video ad, or a time step value of 42 milliseconds for the video ad with a twenty-four frame-per-second frame rate)—the visual element can increment a frame timestamp value next called by the virtual element by the time step value of the video ad. In particular, the visual element can call local memory, a local buffer, or the remote content distribution network for a second frame immediately succeeding the first frame and then display this second frame accordingly. However, if this first duration is greater than the time per frame for the video ad, the visual element can call local memory, the local buffer, or the remote content distribution network for a second frame offset from the first frame by a period of time nearest (and not less than) the first duration. In particular, the visual element can submit a request for a second frame succeeding the first frame and assigned a second timestamp offset from a first timestamp assigned to the first frame by a time nearest (and not less than) the first duration. The visual element can then display this second frame—in replacement of the first frame—immediately or at a time corresponding to the original time offset between the first frame and this second frame. The visual element can then record a second duration of time from submission of a call for a second frame to display of the first frame within the window. If the second duration is less than the time per frame of the video ad, the visual element can call local memory, the local buffer, or the remote content distribution network for a third frame immediately succeeding the second frame and then display the third frame accordingly. However, if the second duration is greater than the time per frame for the video ad, the visual element can instead call a third frame offset from the second frame by a period of time nearest the second duration and then display this third frame immediately or at a time corresponding to the original time offset between the second frame and this third frame.

Furthermore, in the foregoing implementation, the visual element can call a next frame from local memory, the local buffer, or the remote content distribution network at a time preceding a target render time for the next frame by the measured duration from call to render of the preceding frame. The visual element can thus implement a measured time from when a frame is called to when the frame is rendered on the display of the device to set a trigger time to call a next frame—preceding a target render time for the next frame—in order to ensure that the next frames is received and rendered within the visual element at or near the target render time. Specifically, the visual element can feed a measured call-to-render time of one frame of the video ad forward to set a time to a call a next frame in the video ad such that the next frame is received in time to render the next frame at target render time (e.g., a time offset from a render time of the preceding frame by one a corresponding number of time steps).

In the foregoing implementation, the visual element can additionally or alternatively query a graphics-processing unit (or "GPU") within the computer system for its current load. The visual element can then vary an effective frame rate for playback of the video—within the visual element when the visual element is in view within the window—based on the current load of the GPU. For example, the visual element can query the GPU for its current load at a frequency corresponding to the original frame rate of the video. In this example, if the GPU returns a load value above a threshold value (e.g., 75%, 98%) once a first frame in the video is loaded into the visual element, the visual element can preserve the first frame of the video in the visual element, bypass a second frame in the video immediately succeeding the first frame, and index a flag to a third frame in the video immediately succeeding the second frame. In this example, the visual element can again query the GPU for its current load in preparation to load the third frame; if the GPU returns a load value below the threshold value, the visual element can load the third frame at a time succeeding the time the first frame was loaded by twice the inverse of the original frame rate of the video. However, if the GPU again returns a load value above the threshold value, the visual element can preserve the first frame of the video in the visual element, bypass the third frame, and index the flag to a fourth frame in the video immediately succeeding the third frame. The visual element can repeat this process while the visual element remains within the window on the display of the computing device and until the video is completed.

The visual element can thus implement proportional closed-loop feedback control during playback of the video ad within the visual element in order to minimize or eliminate choppy playback and other playback inconsistencies. In particular, by selecting a subsequent frame in the video ad to display in the visual element based on a recorded time to display a preceding frame in the video ad and by preemptively calling the next frame at a time preceding its targeted display time by the measured time to receive and display the preceding frame, the visual element can preserve a global speed of the video ad—though a local frame rate during playback may be less than the original frame rate of the video ad—and ensure that a current or nearly-current frame from the video ad is displayed at any given time during playback even during instances in which the GPU within the computing device is overloaded or otherwise slowed to the point that the graphics card is unable to display frames within the visual element at the original frame rate of the video ad. The visual element can also implement these methods and techniques to maintain a global frame rate of the video ad during playback within the visual element (and/or within a video player or popup window, as described below) even during instances in which limited bandwidth slows download of video ad frames the computing device, such as if slow download speed at the computing device yields extended times for a network to return frames called by the visual element greater than a time step between timestamps of adjacent frames in the video ad.

In the foregoing implementation, the visual element can additionally or alternatively implement integral and/or derivative closed-loop feedback controls or any other suitable type of closed-loop feedback. The visual element can also maintain a clock or other record of a start time at which a first frame is displayed during playback of the video ad and can continuously align a query for and display of a next frame in the video ad to a time since the first time based on the original frame rate of the video ad in order to reduce or eliminate drift over time such that the global playback speed of the video ad at the visual element substantially matches the original playback speed of the video ad.

The visual element can implement similar methods and techniques to load and display frames in the video ad during scroll events. In particular, if the user scrolls through the webpage at such a rapid rate that the rate of new frames loaded into the visual element exceeds a processing speed of the GPU in the computing device, the visual element can implement similar methods and techniques during a scroll event to track a load time for a last called frame and to submit a call for a next frame in the video ad based on this load time. However, the visual element can implement any other methods and techniques during video playback and during scroll events to select frames that meet GPU's current processing limitations and to skip other frames in order to preserve a global frame rate of the video ad during playback and in order to preserve a match between global seek forward and backward speeds and a scroll rate of a scroll event.

2.7 Other Interactions

One variation of the second method S200 includes, in response to selection of the visual element within the window, opening a video player including video replay controls at the computing device and replaying the digital video forward from the first frame. Generally, in this variation, the visual element can link to a more complete video player or popup window in which the video ad can be viewed out of line, with additional controls, with an audio track, and/or at a greater zoom level. The web browser can thus open this link automatically within a video player when a user selects any region of the visual element, and the video player can begin replay of the video ad at its beginning or from a last frame shown in the visual element before the visual element was selected. The video player can include discrete play, pause, seek backward, seek forward, mute, and/or other video controls. The video player can also track a duration or portion of the video ad replayed within the video player and return this to the visual element. If the video ad was not replayed in full within the video player before the video player was closed by the user, the visual element can resume playback of the video ad from a last frame shown in the video player once the video player is closed. The visual element can additionally or alternatively implement such playback data to generate engagement metrics, as described below.

The visual element can additionally or alternatively toggle an audio track output aligned to the video frames within the video ad and output during playback of the video ad in Block S230 in response to selection of the visual element. However, the visual element and/or the webpage can respond to selection of the video ad in any other way.

Furthermore, if the video ad is completed (i.e., viewed in full) through the visual element or through a video player, the visual element can display a blank frame or end frame for the remainder of the duration that the web browser visits the webpage containing the visual element; upon selection of the visual element by the user, the visual element can restart the video ad from the beginning and again execute Blocks S210, S220, and S230 to replay the video ad within the webpage. Alternatively, once the video ad is completed, the visual element can reset the video ad in response to a scroll event that moves the visual element out of the window followed by a scroll event that brings the visual element back into the window. However, the visual element can reset the video ad in any other way and in response to any other input or interaction into the computing device.

2.8 Metrics

One variation of the second method S200 further includes: generating an interaction record including a number of scroll-down events and scroll-up events occurring at the computing device and maintaining the visual element within the window. Generally, in this variation, the visual element can implement methods and techniques described above in the first method to characterize user engagement within the visual element and its content based one or more interactions between the user and the webpage.

In particular, because the visual element updates content shown within the interactive visual ad based on the position of the visual element within a window rendered on a display of a computing device—that is, in response to scroll-down and scroll-up events at the computing device—the visual element (or the ad platform) can generate metrics for user engagement with the interactive visual ad enabled by user controls integrated into the visual element.

In one implementation, the visual element maintains counts of: a number of scroll-down and scroll-up events occurring at the computing device while all or a portion of the visual element is shown in the window; a number of back-to-back scroll-down and scroll-up event pairs; a number of discrete scroll events at scroll speeds less than a threshold scroll speed or within a scroll speed range corresponding to historical peak user engagement; a number of times the visual element enters and exits the window; a maximum duration of the video ad shown within the visual element during a single period in which the visual element is shown continuously within the window; and/or a total duration of the video ad shown within the visual element during a single access to the webpage containing the visual element at the computing device; etc. The visual element can also track: a duration of time that the visual element is shown within the window while the webpage or other document is accessed at the computing device; and a click-through event, including whether the user selected the interactive video ad to navigate to out-of-line video player or to another destination URL stored in the visual element metadata, as described above. For example, in addition to metrics described above in Block S170, the visual element can append an interaction record for the instance of the visual element loaded into the webpage with a total duration of the video ad represented by frames inserted into the visual element before navigation to an alternate webpage or closure of the web browser at the computing device.

The visual element can also calculate an interaction quality for the instance of the interactive video ad. For example, the visual element can classify user interaction with the interactive video ad as: "no engagement" if the user rapidly (e.g., faster than a threshold speed) scrolls the visual element from the bottom of the window to the top of the window and does not revisit the visual element; "limited engagement" if less than 50% of the duration of the video ad is replayed between Blocks S210 and S230; "moderate engagement" if the user slowly scrolls the visual element into the window and if 50-75% of the duration of the video ad is replayed between Blocks S210 and S230; "good engagement" if the user scrolls up and then scrolls down once with the visual element within the window and if 75-100% of the duration of the video ad is replayed within the visual element or within the video player; and "excellent engagement" if the user scrolls up and scrolls down more than once following entry of the visual element into the window and 100% of the duration of the video ad is replayed within the visual element or within the video player. However, the visual element can implement any other method or technique to characterize user interactions with the visual element and its content.

Once a user selects the visual element to trigger replay of the video in a separate video player or popup window, the visual element can also query the separate video player or popup window for a timestamp of a last frame of the video replayed before the separate video player or popup window is existed and can generate a interaction metric for a duration of the video consumer by the user accordingly. Therefore, in addition to capturing user interaction data relating to whether a user selects the visual element to trigger replay of the video in a separate video player or popup window and relating to a duration of the video viewed in the separate video player or popup window, the visual element can also capture interaction data relating to how a user manipulates the visual element within the window, a number of scroll-up and -down events performed within the window by the user, and a number of frames or a duration of the video ad presented to the user within the window. The visual element (or the ad platform) can merge these intra- and extra-visual element data into a more complete characterization of a user's engagement with content within the video ad.

The visual element can then package any one or more of the user engagement metrics and return these user metric data to the publisher, advertiser, or other entity. Alternatively, the visual element can return raw interaction data (e.g., scroll event counts) as described above to the ad platform, and the ad platform can implement similar methods and techniques to transform these raw interaction data into one or more user engagement metrics and to then serve these engagement metrics to one or more external entities. However, the visual element and/or the ad platform can generate and handle user engagement metrics of any other type in any other suitable way.

Blocks of the first method S100 and the second method S200 described above can be executed by a visual element within a webpage accessed through a web browser, within a mobile or native application, or within any document of any other type accessed via any other application executing on a computing device, such as a smartphone, a smartwatch, a tablet computer, a laptop computer, or a desktop computer, or other computing device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for serving interactive advertising content, the method comprising:
   via a set of servers, receiving an interactive advertising content request comprising information concerning a height of a window of a user computing device;
   via a set of processors of the set of servers, processing the interactive advertising content request to select interactive advertising content comprising a plurality of frames based at least in part on the information concerning the height of the window; and
   via the set of servers, transmitting the selected interactive advertising content to an electronic document of the user computing device, the electronic document comprising content distinct from content represented by the plurality of frames and configured to:
      incorporate an interactive advertising content player, an initial vertical position of which is detected to be located outside of the window and subsequently is relocated from the initial vertical position to a first vertical position after a first scroll event, the first vertical position located within the window;
      display a first frame of the plurality of frames via the interactive advertising content player after the first scroll event, the first frame assigned to the first vertical position;
      allow for a second scroll event comprising a relocation of the interactive advertising content player from the first vertical position to a second vertical position located within the window and above the first vertical position;
      display a second frame of the plurality of frames via the interactive advertising content player after the second scroll event, the second frame assigned to the second vertical position;
      allow for a third scroll event comprising a relocation of the interactive advertising content player from the second vertical position to a third vertical position located within the window and below the second vertical position; and
      display the first frame of the plurality of frames via the interactive advertising content player after the third scroll event, the first frame assigned to the third vertical position.

2. A method for serving interactive advertising content, the method comprising:
   loading an image into a media player inserted into an electronic document rendered within a window by a mobile device, the media player defining a first height less than a second height of the window, the image comprising content representing a first subject distinct from a second subject of content presented within the electronic document; and
   at the media player:
      in response to a first scroll event that moves the media player to a first vertical position within the window, rendering a first region of the image within the media player, the first region assigned to a first range of vertical positions including the first vertical position;
      in response to the media player remaining within the first range of vertical positions within the window, maintaining the first region of the image rendered within the media player; and
      in response to a second scroll event that moves the media player to a second vertical position within the window, rendering a second region of the image within the media player in replacement of the first region, the second region assigned to a second range of vertical positions including the second vertical position.

3. The method of claim 1:
   wherein transmitting the selected interactive advertising content to the electronic document configured to incorporate the interactive advertising content player comprises transmitting the selected interactive advertising content to the electronic document configured to incorporate the interactive advertising content player defining a second height less than the height of the window.

4. The method of claim 1, further comprising:
   via the set of servers, receiving a second interactive advertising content request comprising information concerning a second height of a second window of a second user computing device;
   via the set of processors, processing the second interactive advertising content request to select interactive advertising content comprising a second plurality of frames based at least in part on the information concerning the second height of the second window; and
   via the set of servers, transmitting the selected interactive advertising content to a second electronic document of the second user computing device, the second electronic document configured to:
      incorporate a second interactive advertising content player, an initial vertical position of which is detected to be located outside of the window and is subsequently relocated from the initial vertical position to a first vertical position after a fourth scroll event, the first vertical position located within the second window;
      display a third frame of the second plurality of frames via the second interactive advertising content player after the fourth scroll event, the third frame assigned to the first vertical position;
      allow for a fifth scroll event comprising a relocation of the second interactive advertising content player from the first vertical position to a second vertical position located within the second window and above the first vertical position; and
      display a fourth frame of the second plurality of frames via the second interactive advertising content player after the fifth scroll event, the fourth frame assigned to the second vertical position.

5. The method of claim 1:
   wherein transmitting the selected interactive advertising content to the electronic document comprises transmitting the selected interactive advertising content to the electronic document configured to:
      allow for a fourth scroll event comprising relocation of the interactive advertising content player from the second vertical position to a fourth vertical position located within the window and above the second vertical position; and
      display a third frame of the plurality of frames via the interactive advertising content player after the fourth scroll event, the third frame assigned to the fourth vertical position.

6. The method of claim 1:
wherein transmitting the selected interactive advertising content to the electronic document configured to display the second frame of the plurality of frames via the interactive advertising content player after the second scroll event comprises transmitting the selected interactive advertising content to the electronic document configured to display the second frame, succeeding the first frame in the plurality of frames, via the interactive advertising content player after the second scroll event.

7. The method of claim 1:
wherein processing the interactive advertising content request to select interactive advertising content comprising the plurality of frames comprises selecting the plurality of frames from a sequence of frames representing a video advertisement.

8. The method of claim 1:
wherein processing the interactive advertising content request to select interactive advertising content comprising the plurality of frames comprises:
selecting the plurality of frames from a sequence of frames representing a video advertisement; and
compiling the plurality of frames into a static image defining a plurality of regions, each frame, in the plurality of frames, corresponding to a region in the plurality of regions; and
wherein transmitting the selected interactive advertising content to the electronic document comprises transmitting the selected interactive advertising content to the electronic document configured to:
display a first region, in the plurality of regions, of the static image corresponding to the first frame, of the plurality of frames, via the interactive advertising content player after the first scroll event;
display a second region, in the plurality of regions, of the static image corresponding to the second frame, of the plurality of frames, via the interactive advertising content player after the second scroll event; and
display the first region of the static image corresponding to the first frame via the interactive advertising content player after the third scroll event.

9. The method of claim 1:
wherein transmitting the selected interactive advertising content to the electronic document comprises transmitting the selected interactive advertising content to the electronic document configured to:
during the second scroll event, display a first sequence of frames, in the plurality of frames, succeeding the first frame and preceding the second frame via the interactive advertising content player, the first sequence of frames assigned to a first sequence of vertical positions interposed between the first vertical position and the second vertical position.

10. The method of claim 9:
wherein transmitting the selected interactive advertising content to the electronic document configured to display the first sequence of frames comprises transmitting the selected interactive advertising content to the electronic document configured to render the first sequence of frames at a first rate proportional a relocation rate of the second scroll event.

11. The method of claim 2:
wherein loading the image into the media player comprises:
via a set of servers, receiving an interactive advertising content request from the mobile device, the interactive advertising content request comprising the second height of the window;
via a set of processors of the set of servers, selecting a subset of frames from a set of frames representing interactive advertising content based on the second height of the window;
assembling the subset of frames into the image; and
loading the image into the media player.

12. The method of claim 2, further comprising, in response to a third scroll event that moves the media player to a third vertical position within the window, rendering the first region of the image within the media player in replacement of the second region, the first region assigned to the first range of vertical positions comprising the third vertical position.

13. A method for serving interactive advertising content, the method comprising:
via a set of servers, receiving an interactive advertising content request comprising information concerning a height of a window of a user computing device;
via a set of processors of the set of servers, selecting a subset of frames from a set of frames representing interactive advertising content based on the height of the window; and
via the set of servers, at a media player inserted within an electronic document rendered by the user computing device, the electronic document comprising content distinct from content represented by the subset of frames:
in response to a first scroll event that relocates the media player from an initial vertical position outside the window to a first vertical position within the window, rendering a first frame of the subset of frames via the media player, the first frame assigned to the first vertical position;
in response to a second scroll event that relocates the media player
from the first vertical position to a second vertical position within the window and above the first vertical position, rendering a second frame of the subset of frames via the media player, the second frame assigned to the second vertical position; and
in response to a third scroll event that relocates the media player from the second vertical position to a third vertical position within the window and below the second vertical position, rendering the first frame via the media player, the first frame assigned to the third vertical position.

14. The method of claim 13:
wherein rendering the first frame via the media player in response to the first scroll event comprises:
detecting relocation of the media player from the initial vertical position to the first vertical position; and
rendering the first frame within the media player, the first region assigned to the first vertical position; and
wherein rendering the second frame via the media player in response to the second scroll event comprises:
detecting relocation of the media player from the first vertical position to the second vertical position; and
rendering the second frame within the media player.

15. The method of claim 13:
further comprising, during the second scroll event, rendering a first sequence of frames, in the plurality of frames, succeeding the first frame and preceding the second frame via the media player, the first sequence of frames assigned to a first sequence of vertical positions interposed between the first vertical position and the second vertical position.

16. The method of claim 13:
further comprising, via the set of servers, at the media player, in response to a fourth scroll event that relocates the media player from the second vertical position to a fourth vertical position within the window and above the second vertical position, rendering a third frame, in the plurality of frames, via the media player, the third frame assigned to the fourth vertical position.

17. The method of claim 13, further comprising:
during the second scroll event, rendering a first sequence of frames, in the plurality of frames, at a first frame rate corresponding to a first rate of the second scroll event via the media player, the first sequence of frames assigned to a first sequence of vertical positions interposed between the first vertical position and the second vertical position; and
during the third scroll event, rendering a second sequence of frames, in the plurality of frames, at a second frame rate corresponding to a second rate of the third scroll event via the media player, the second sequence of frames assigned to a second sequence of vertical positions interposed between the second vertical position and the third vertical position.

18. The method of claim 13, further comprising:
via the set of servers, receiving a second interactive advertising content request comprising information concerning a second height of a second window of a second user computing device;
via the set of processors, selecting a second subset of frames from the set of frames representing interactive advertising content based on the second height; and
via the set of servers, at a second media player inserted within a second electronic document rendered by the second user computing device:
in response to a fourth scroll event that relocates the second media player from a second initial vertical position outside the second window to a fourth vertical position within the second window, rendering a third frame of the second subset of frames via the media player, the third frame assigned to the fourth vertical position;
in response to a fifth scroll event that relocates the second media player from the fourth vertical position to a fifth vertical position within the second window and above the fourth vertical position, rendering a fourth frame of the second subset of frames via the media player, the fourth frame assigned to the fifth vertical position; and
in response to a sixth scroll event that relocates the second media player from the fifth vertical position to a sixth vertical position within the second window and below the fifth vertical position, rendering the third frame via the second media player, the third frame assigned to the sixth vertical position.

19. The method of claim 13:
wherein rendering the first frame of the subset of frames via the media player inserted within the electronic document rendered by the user computing device comprises rendering the first frame of the subset of frames via the media player inserted within a webpage rendered by the user computing device.

20. A method for serving interactive advertising content, the method comprising:
loading an image into a media player inserted into an electronic document rendered within a window by a user computing device, the media player defining a first height less than a second height of the window, the image comprising content representing a first subject distinct from a second subject of content presented within the electronic document; and
at the media player:
in response to a first scroll event that moves the media player to a first vertical position within the window, rendering a first region of the image within the media player, the first region assigned to a first range of vertical positions including the first vertical position;
in response to the media player remaining within the first range of vertical positions within the window, maintaining the first region of the image rendered within the media player;
in response to a second scroll event that moves the media player to a second vertical position within the window, rendering a second region of the image within the media player in replacement of the first region, the second region assigned to a second range of vertical positions including the second vertical position; and
in response to a third scroll event that moves the media player to a third vertical position within the window, rendering a third region of the image within the media player, the third region assigned to a third range of vertical positions including the third vertical position.

21. The method of claim 20, wherein loading the image into the media player comprises:
via a set of servers, receiving an interactive advertising content request from the user computing device, the interactive advertising content request comprising the second height of the window;
via a set of processors of the set of servers, selecting a subset of frames from a set of frames representing interactive advertising content based on the second height of the window;
assembling the subset of frames into the image; and
loading the image into the media player.

22. The method of claim 20, wherein loading the image into the media player inserted into the electronic document rendered within the window by the user computing device comprises loading the image into the media player inserted into the electronic document rendered within the window by the user computing device comprising a mobile device.

23. The method of claim 20, wherein loading the image into the media player inserted into the electronic document rendered within the window by the user computing device comprises loading the image into the media player inserted into the electronic document rendered within the window by the user computing device comprising a desktop computer.

24. The method of claim 20, further comprising:
further comprising:
via a set of servers, receiving an interactive advertising content request comprising information concerning the second height of the window;
via a set of processors of the set of servers, processing the interactive advertising content request to select interactive advertising content comprising a plurality of frames based at least in part on the information concerning the second height of the window; and
wherein loading the image into the media player comprises, via the set of servers, transmitting the selected interactive advertising content, comprising the image, to the electronic document.

25. The method of claim 1:
wherein processing the interactive advertising content request to select interactive advertising content comprising the plurality of frames comprises processing the interactive advertising content request to select interactive advertising content comprising the plurality of frames assembled into an image; and
wherein transmitting the selected interactive advertising content to the electronic document comprises transmitting the selected interactive advertising content, comprising the image, to the electronic document.

* * * * *